(12) United States Patent
An

(10) Patent No.: US 8,976,624 B2
(45) Date of Patent: Mar. 10, 2015

(54) SYSTEM AND METHOD FOR PROCESSING SEISMIC DATA FOR INTERPRETATION

(75) Inventor: Ping An, Katy, TX (US)

(73) Assignee: GeoCyber Solutions, Inc., Katy, TX (US)

( * ) Notice: Subject to any disclaimer, the term of this patent is extended or adjusted under 35 U.S.C. 154(b) by 1509 days.

(21) Appl. No.: 12/154,276

(22) Filed: May 21, 2008

(65) Prior Publication Data

US 2008/0285383 A1    Nov. 20, 2008

Related U.S. Application Data

(63) Continuation-in-part of application No. 11/563,204, filed on Mar. 20, 2007, now abandoned, and a continuation-in-part of application No. 11/382,042, filed on May 7, 2006, now abandoned.

(51) Int. Cl.
*G01V 1/28* (2006.01)

(52) U.S. Cl.
CPC .............. *G01V 1/28* (2013.01); *G01V 2210/20* (2013.01)
USPC .......................................................... 367/38

(58) Field of Classification Search
CPC ............ G01V 1/28; G01V 1/32; G01V 1/364
USPC .............. 367/21, 28, 43–47, 73; 702/6, 13, 17
See application file for complete search history.

(56) References Cited

U.S. PATENT DOCUMENTS

| | | | |
|---|---|---|---|
| 4,312,050 A * | 1/1982 | Lucas .............................. | 367/44 |
| 4,922,465 A * | 5/1990 | Pieprzak et al. ................ | 367/38 |
| 5,051,960 A | 9/1991 | Levin | |
| 5,051,963 A | 9/1991 | Linville et al. | |
| 5,150,333 A | 9/1992 | Scherbatskoy | |
| 5,173,879 A * | 12/1992 | Cung et al. ....................... | 367/46 |
| 5,197,039 A | 3/1993 | Corcoran | |
| 5,206,837 A | 4/1993 | Beasley et al. | |
| 5,236,757 A | 8/1993 | Probst et al. | |
| 5,237,538 A | 8/1993 | Linville et al. | |
| 5,657,294 A | 8/1997 | Zhang | |
| 5,671,136 A | 9/1997 | Willhoit, Jr. et al. | |
| 5,673,191 A | 9/1997 | Chapin et al. | |
| 5,848,379 A | 12/1998 | Bishop | |
| 6,038,197 A | 3/2000 | Sitton et al. | |

(Continued)

FOREIGN PATENT DOCUMENTS

WO        2009-142614 A1    11/2009

OTHER PUBLICATIONS

An, "Application of multi-wavelet seismic trace decomposition and reconstruction to seismic data interpretation and reservoir characterization," SEG Annual Meeting, Oct. 1-6, 2006, New Orleans.*

(Continued)

*Primary Examiner* — Daniel L Murphy
(74) *Attorney, Agent, or Firm* — Alberto Q. Amatong, Jr.; The Amatong Law Firm, PLLC

(57) ABSTRACT

A method is provided for processing seismic data for interpretation. The method includes recording an original seismic data trace, decomposing the original seismic data trace into a set of predefined wavelets, and reconstructing a seismic data trace from, at least a subset of, the set of wavelets.

20 Claims, 33 Drawing Sheets

(56) References Cited

U.S. PATENT DOCUMENTS

| | | | |
|---|---|---|---|
| 6,125,210 | A | 9/2000 | Yang |
| 6,553,148 | B2 | 4/2003 | Zeng et al. |
| 6,801,473 | B2 | 10/2004 | Matteucci et al. |
| 6,982,927 | B2 | 1/2006 | Taner |
| 6,987,706 | B2 | 1/2006 | Wood |
| 7,072,767 | B2 | 7/2006 | Routh et al. |
| 7,126,876 | B1 | 10/2006 | Rowland et al. |
| 7,164,619 | B2 | 1/2007 | Robertsson et al. |
| 7,196,969 | B1 | 3/2007 | Karazincir |
| 7,239,578 | B2 | 7/2007 | Robinson |
| 2001/0046185 | A1 | 11/2001 | Hornbostel et al. |
| 2005/0018538 | A1 | 1/2005 | Soubaras |
| 2005/0152220 | A1 | 7/2005 | Kritski et al. |
| 2005/0190649 | A1 | 9/2005 | Eisner et al. |
| 2006/0092764 | A1 | 5/2006 | Robertsson et al. |
| 2007/0064529 | A1* | 3/2007 | Robinson ........................ 367/31 |
| 2007/0258323 | A1 | 11/2007 | An |
| 2007/0274155 | A1 | 11/2007 | Ikelle |
| 2008/0232193 | A1 | 9/2008 | An |

OTHER PUBLICATIONS

Ryan, "Ricker, Ormsby, Klauder, Butterworth—A Choice of Wavelets," CSEG Recorder, Sep. 1994, pp. 8-9.*

"Maxican hat wavelet," Wikipedia, downloaded Jul. 25, 2012 from http://en.wikipedia.org/wiki/Mexican_hat_wavelet, p. 1.*

"Continuous wavelet transform," Wikipedia, downloaded Jul. 24, 2014 from http://en.wikipedia.org/wiki/Continuous_wavelet_transform, pp. 1-5.*

"Wavelet," Wikipedia, retrieved Jul. 24, 2014 from http://en.wikipedia.org/w/index.php?title=Wavelet&oldid=615590873, pp. 1-16.*

International Search Report and Written Opinion mailed Dec. 10, 2008 (issued in PCT Application No. PCT/US2008/009945).

Vibrations and Waves. The MIT Introductory Physics Series. 1971. pp. 213-219.

Ryu, Jisoo. Decomposition (DECOM) approach applied to wave field analysis with seismic reflection records. Geophysics. vol. 47. No. 6. Jun. 1982. pp. 869-883.

* cited by examiner

SYSTEM AND METHOD FOR PROCESSING SEISMIC DATA FOR INTERPRETATION

RELATED APPLICATION

This application is a continuation-in-part of U.S. patent application Ser. No. 11/563,204, filed on Mar. 20, 2007 and also a continuation-in-part of U.S. patent application Ser. No. 11/382,042 filed on May 7, 2006. The above patent applications are each hereby incorporated by reference for all purposes and made a part of the present disclosure.

FIELD OF THE INVENTION

The instant system and method relates generally to the field of geophysical prospecting and more particularly, seismic prospecting, including, processing seismic data for interpretation.

BACKGROUND OF THE INVENTION

Seismic prospecting entails generating elastic waves in a subterranean formation through artificial means and analyzing the response from the formation to describe the properties of the formation. Seismic prospecting is characterized by three stages: data acquisition; data processing; and data interpretation. To initiate data acquisition, a seismic source generates a seismic wave that propagates into the earth and is, at least partially, reflected by subsurface seismic reflectors. The reflected signals are then recorded by seismic receivers or receiver arrays that are positioned at various locations relative to the seismic source. The recorded seismic data are referred to as seismic data traces, which represent the response of an elastic wavefield to velocity and density constraints across interfaces of rock or sediment. The seismic data trace may contain a plurality of reflected signals received from the formation. Typically, the retrieved seismic data traces are processed further into a form that is better suited for interpretation. Interpretation of the processed seismic data can yield valuable information on the subterranean formations.

A seismic data trace is represented in a computer as a float point data array. The numbers in the data array are equal interval amplitude samples. Thus, if the sample interval is 2 ms, a one second long seismic data trace will have 500 samples. The graph 10 shown in FIG. 1 is an example of a recorded seismic data trace, T. The numbers, N on each side, show the recording time starting from zero to more than one second. The shaded portion of the recorded data trace, on the right side shows the positive amplitude and the unshaded area on the left side shows the negative amplitude. Seismic data traces typically contain both the desired seismic reflections and one or more unwanted noise components, including various velocity ground roll noises and low or high frequency noises. It is generally known that these noises can overwhelm the desired seismic reflections and reduce the accuracy of interpretation based on the seismic data traces. Accordingly, improved methods for attenuating noise components so as to obtain seismic data traces that more accurately reflect properties of the target subterranean formation are particularly desirable.

One conventional method for attenuating unwanted noise components in seismic data traces may be referred to as a common-midpoint (CMP) stacking method (the "CMP" method). The "midpoint" for a seismic data trace is the point located midway between the source location and the receiver location for that trace. According to the CMP method, seismic data traces are recorded for multiple source-receiver pairs. The recorded seismic data traces are sorted into common-midpoint gathers or collections of seismic data traces having the same midpoint but different source-to-receiver offset distances. The seismic data traces within each CMP gather are first corrected for static and normal moveout. The corrected seismic data traces are then summed or "stacked" to yield a stacked data trace that is a composite of the individual seismic data traces in the CMP gather. Before "stacking", the individual seismic data traces are referred to as pre-stack seismic data traces. After stacking, the summed or stacked data traces are referred to as post-stack seismic data traces. Typically, a post-stack seismic data trace exhibits a significantly improved signal-to-noise ratio compared to a pre-stack seismic data trace.

Both types of seismic data traces can be divided into wavelets that are reflected from petrophysical or lithological boundaries or reflectors in the subsurface at different depths. A seismic wavelet or an embedded wavelet is defined as a seismic pulse usually consisting of only a few cycles. An embedded wavelet or basic wavelet is the time domain reflection shape from a single positive reflector at normal incidence. A wavelet may be defined by its amplitude and shape. The amplitude may be a constant or a variable of a positive or negative real number. The shape of the wavelet may be described by a mathematical function or time series of amplitude samples. Seismic data traces may also contain noise that can be separated or divided into the form of wavelets. As described in the Detailed Description of Preferred Embodiments, "modified" seismic data traces may be generated using wavelets derived from originally recorded seismic data traces or from processed seismic data traces to yield seismic data that more accurately reflect the properties of the target subterranean formation.

SUMMARY OF THE INVENTION

The present invention is directed to a method of processing seismic data for interpretation by first recording an original seismic data trace, and then decomposing the original seismic data trace into a set of predefined wavelets. Next, a seismic data trace is reconstructed from, at least a subset of, the set of predefined wavelets. The result is a seismic data trace better suited for interpretation and/or for further processing prior to interpretation. The present invention is also directed to a system operable to perform one or more of the method steps.

BRIEF DESCRIPTION OF THE DRAWINGS

For a further understanding of the nature and objects of the present invention, reference should be had to the following Detailed Description, taken in conjunction with the accompanying drawings, in which like elements are given the same or analogous reference numbers.

DETAILED DESCRIPTION OF PREFERRED EMBODIMENTS

The present invention is directed to an improved method of processing seismic data for interpretation. In one respect, the present invention provides a method, whereby wavelets are utilized to produce "modified" seismic data that may, in certain applications, more accurately represent physical properties of the target subterranean formation and/or facilitate the subsequent interpretation technique.

In the field of seismic prospecting, the conventional model for a seismic data trace employs the mathematical convolutional model. The mathematical convolution model entails the convolution of a single source wavelet with a seismic reflection coefficient function:

$$x(t)=w(t)*r(t)+n(t)$$

where x(t) is the recorded seismogram, w(t) is the seismic source wavelet, r(t) is the earth's reflectivity function, n(t) is random noise, and "*" represents a mathematical convolution. This model is used and implied in seismic data processing and interpretation, such as deconvolution and inversion.

The mathematical convolution model makes the assumption that the source wavelet remains invariant with respect to shape as it travels through the subsurface ("the single wavelet assumption"). The present Applicant recognizes, however, that the frequency of the source wavelet is reduced with increasing depth, thereby changing the source wavelet as it passes through different structures or formations. Also, the seismic responses are affected, and changes, as the seismic wave or reflected signal travels past a subsurface layer or encounters a change in physical property(ies) within the formation. Specifically, the shape of a seismic wavelet changes as the wavelet passes through an interruption in subsurface layer or properties. The type and magnitude of the change depend on the specific changes in the properties of the layers. Accordingly, the change in wavelet shape may be analyzed to evaluate the changes in formation and petrophysical properties. To achieve improved evaluations, the present invention opts to reject the single wavelet assumption and instead, represent a seismic data trace in terms of multiple wavelets.

The shape of a wavelet changes as the signal penetrates through a subsurface formation. The changes in the wavelet shape may reflect changes in the physical properties of the formation such as different types of rock or other characteristics. Thus, any change in the wavelet shape may become an important factor for determining change in the physical characteristics of a subsurface formation.

Figure 1:
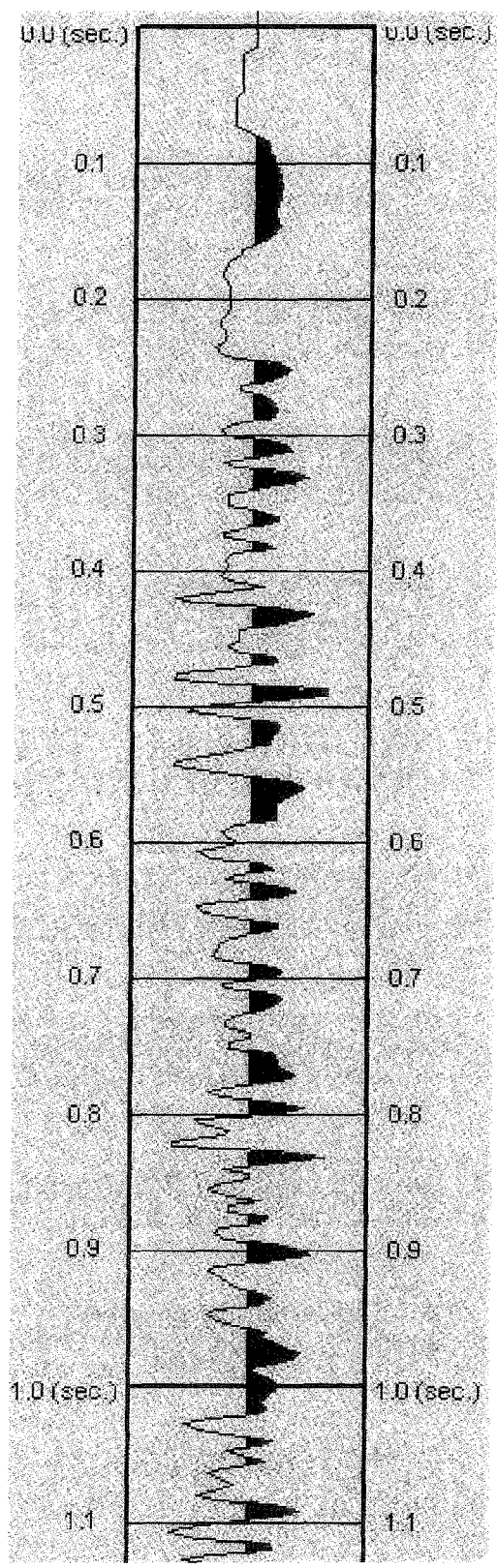
FIG. 1 illustrates a conventional seismic data trace record.
Figure 2:
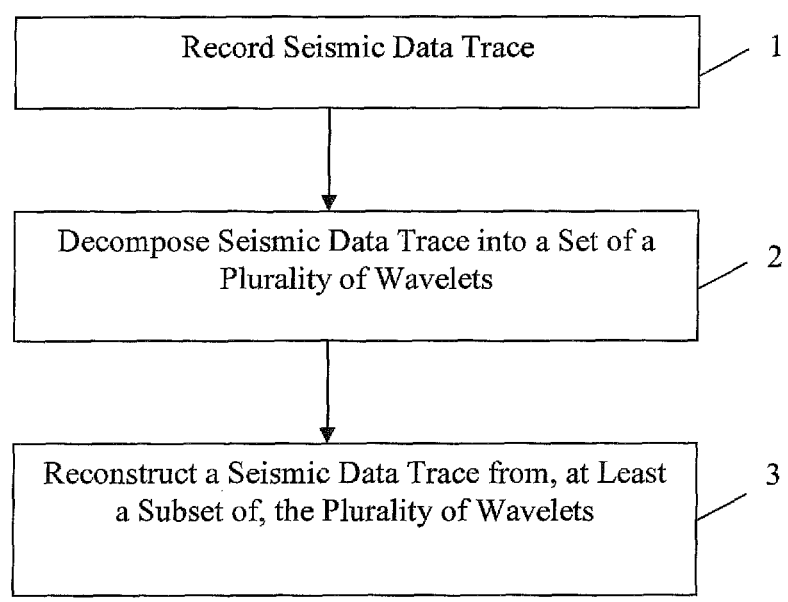
FIG. 2 is a flow diagram illustrating a basic embodiment of a method of processing seismic data for interpretation according to the present invention.
Figure 2A:
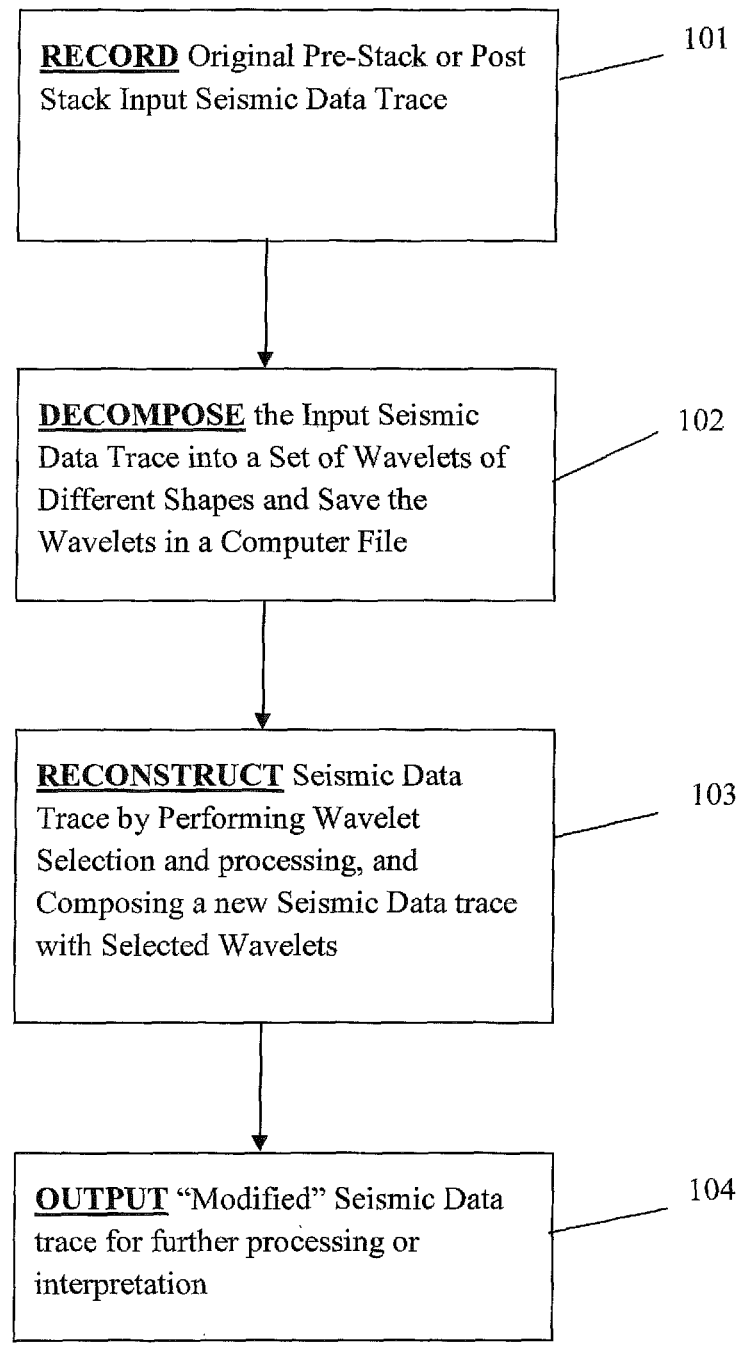
FIG. 2A is a flow diagram of an exemplary method of processing seismic data for interpretation.

FIG. 2 illustrates, in simplified form, a basic embodiment of a method of processing seismic data for interpretation, according to the present invention. FIG. 2A illustrates an exemplary and more preferred embodiment of the processing method. In an initial step 1, an original seismic data trace is recorded (see also recorded original seismic data trace in FIG. 4). As discussed previously, seismic energy is emitted by a seismic source and reflected by a geological feature of the target subterranean formation. The seismic data trace is the record of the response received by receivers at known locations relative to the seismic source. FIG. 1 shows the conventional graphical display of a seismic data trace. Any suitable means for recording the seismic data trace may be employed.

In a preferred embodiment, recording the seismic data trace includes input of the original seismic data trace into a processing system (101). Moreover, the input of the seismic data trace may be preceded by a pre-stacking or post-stacking sub-process, as generally employed and known in the art.

In a subsequent step 2, the original seismic data trace is decomposed into a set of wavelets, i.e., a plurality of wavelets. In one aspect of the preferred embodiment, the seismic data trace is decomposed into a set that includes a plurality of wavelets of different shapes and the wavelets are saved onto a computer file (Step 102). A seismic data trace is then reconstructed from at least a subset of the set of wavelets (Step 3). In one embodiment, the original seismic data trace is reconstructed using all of the wavelets in the set. Preferably, the seismic data trace is reconstructed by reading wavelets or wavelet information from the computer file, selecting wavelets for processing, and composing the new seismic data trace from the selected wavelets (Step 103). A new seismic data trace may be generated directly from the selected wavelets or from wavelets resulting from further processing. The reconstructed seismic data trace, "modified" in form from the original seismic data traces, then preferably output for further processing or interpretation (Step 104).

In one respect, the above-described methods are distinguishable from prior art seismic data processing techniques in that the present methods involve processing a plurality of wavelets derived, directly or indirectly, from the original seismic data trace. Convention processing techniques may be applied to the wavelets (e.g., gain control, stacking, moveout, etc.). An example is gain control. As discussed above, the conventional model of a seismic data trace makes the assumption of a single wavelet. This single wavelet assumption is actually implied in prior art seismic data processing and interpretation, so as to simplify processing. However, until the process and methods described herein, there was no better practical way to evaluate the wavelets. Because it does not employ the single wavelet assumption, the method of processing seismic data described herein employs steps that are not carried out in conventional processing techniques and which may make the overall method more complicated or involved. Nevertheless, the result is, in certain applications, a more accurate system and method of seismic data processing and interpretation.

Wavelets and Wavelet Generators

Before proceeding with a detailed description of preferred embodiments, the definitions of certain terms as used in the present Description (and in the claims) are provided:

Wavelets are mathematical functions used to represent data sets. Wavelets are embedded in a seismic data trace (.i.e., a seismic data trace contains wavelets).

Seismic data traces are the recorded responses from seismic prospecting.

Figures 4, 4A:
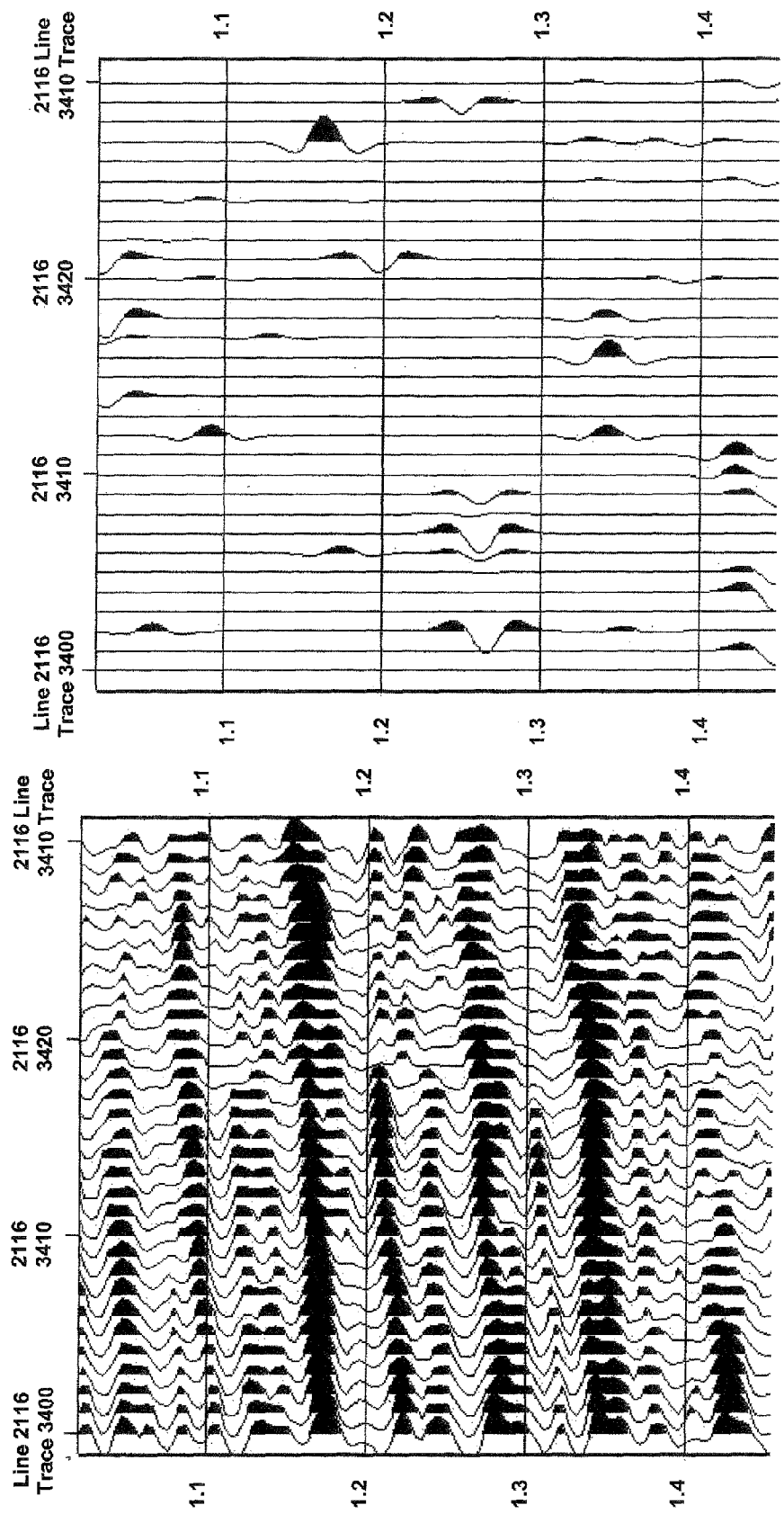
FIG. 4 illustrates an exemplary original seismic section, according to the present invention.
FIG. 4A illustrates a reconstructed seismic section with wavelets of 20 Hz dominant frequency.

A seismic section is a seismic data trace on a line (which can be straight or not straight). A seismic section contains more than one seismic data trace. FIG. 1 is provides an exemplary seismic data trace and FIG. 4 provides an exemplary seismic section.

An Extracted Wavelet is a wavelet shape that is computed from a real seismic data trace or seismic data traces. Such a wavelet results from reflection of an actual wavetrain on a single sharp interface with a positive reflection coefficient.

A Synthetic Wavelet is an artificial wavelet characterized by a shape that is used to estimate the wavelet that results from reflection of an actual wavetrain on a single sharp interface with a positive reflection coefficient.

A Wavelet Base is a collection of wavelets and wavelet generators.

Some wavelets can be presented as a mathematical formula. These wavelets are called analytical wavelets. A Ricker wavelet is one example of an analytical wavelet. Some wavelets cannot be presented in the form of math formulae and are presented, instead, in the form of a time-series, digital array of amplitude samples. These wavelets are called digital wavelets. An extracted wavelet is an example of a digital wavelet. After amplitude normalization, an extracted wavelet may be represented by an amplitude value and a normalized time series of amplitude samples.

A wavelet generator is a programmable system for generating a wavelet series that is used for seismic trace decomposition. For analytical wavelet types, the wavelet generators are essentially computer implementations of their corresponding math formulae. The wavelets can be computed efficiently given the wavelet parameters. For digital wavelets, the wavelet generators are computer implementations that extract wavelets from seismic data traces and generate wavelet series for seismic trace decomposition.

It will become apparent to one skilled in the relevant art, upon further review of the present disclosure, that one or more types of wavelets may be used in the practice of embodiments of the present invention.

For convenience, the wavelets in a wavelet base may be referenced by characteristics of the wavelets. As shown below in exemplary applications, the wavelets may be referenced by and grouped according to dominant or maximum amplitude frequencies. For example, one wavelet may be identified as 10 Hz (its dominant frequency) and another wavelet as 20 Hz. In a further example, the wavelets contained in a wavelet base are identified by dominant frequency(ies) and graphically arranged from wavelets of low dominant frequencies to wavelets of high dominant frequencies. Each type of wavelet preferably contains a series of wavelets ranging from low dominant frequency to high frequency. It should be appreciated that a wavelet base may contain more than one type of wavelet, such as Ricker wavelet or even a user-defined wavelet. Each type of wavelet, based on its dominant frequency and/or maximum amplitude frequency, forms a series of wavelets. For example a Ricker wavelet having a low dominant frequency of 3 Hz and maximum dominant frequency of 80 Hz will have 80−3+1 wavelets in the Ricker wavelet series in the wavelet data base.

Decomposition

Figure 3A:
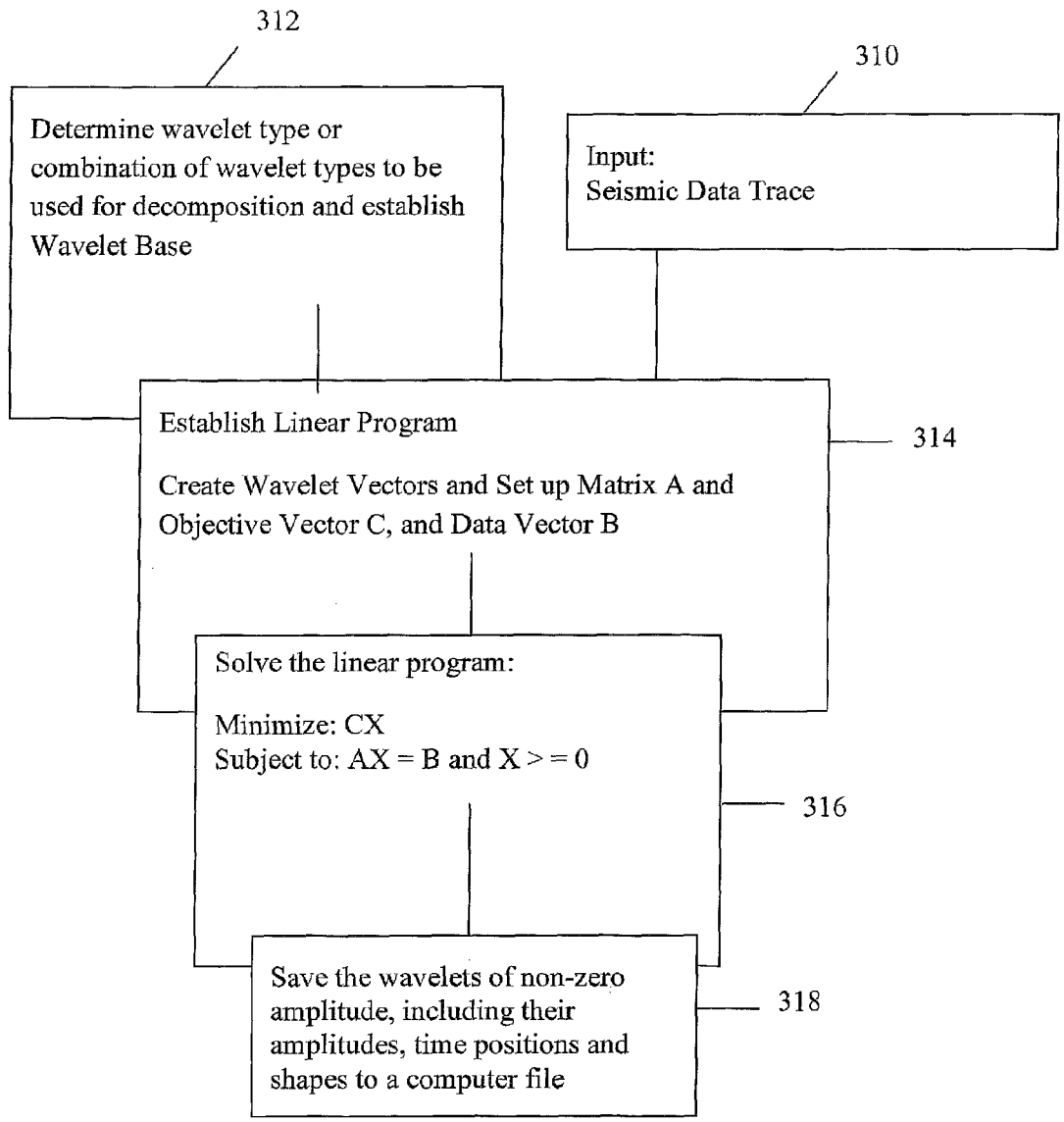
FIG. 3A is a flow diagram of an exemplary sub-process of decomposing a seismic trace.

FIG. 3A illustrates, in simplified form, an exemplary sub-process of decomposing an original seismic data trace generated in a target subterranean formation. In accordance with this embodiment, the seismic data trace is received, and more preferably, input into a suitable programmable processing system (Step 310). FIG. 1 shows a seismic data trace record, as generally known in the art. A seismic data trace is actually an array of amplitude samples of equal time intervals. For example, a seismic data trace of one second long and two milliseconds sample interval has 500 amplitude samples or numbers. This seismic data trace can be treated as a data vector of size 500. To facilitate the present description, a wavelet vector is defined herein as a vector that contains only one wavelet and has the same number of amplitude samples as the seismic data trace to be decomposed. From each wavelet, wavelet vectors may be generated by placing the wavelet at each time position of the amplitude samples.

In conjunction with, or immediately after, the input of a seismic data trace (Step 310), a wavelet base is established (Step 312). In the preferred embodiment, this entails first determining a wavelet type or combination of wavelet types for the wavelet base. The wavelet base may contain extracted and synthetic wavelets and further, the wavelets in the base may be grouped by wavelet type. Types of wavelets include extracted wavelets, Ricker wavelets, minimum phase wavelets, maximum phase wavelets, various user-defined wavelets, and the like. In exemplary applications, the wavelets in the base are referenced by type and dominant frequency(ies). It is noted that the selection and use of a wavelet base was not employed or necessary in prior art seismic data processing as it was not known how to represent the seismic data trace in terms of multiple wavelets.

The wavelet types selected for the decomposition step depends on the interpretation technique to follow the data processing. The selected wavelets will preferably be those the user knows or suspects will lead to a reconstructed seismic data trace that is well suited for the specific interpretation technique. For example, if the seismic data trace is to be the subject of structural interpretation and/or reservoir prediction, the original seismic data trace may be decomposed into synthetic wavelets such as Ricker wavelets of different dominant frequencies.

In a preferred method, a wavelet base that contains wavelets of different types is established using a computer processor. For each wavelet type, a series of wavelets may be included in the wavelet base with each wavelet being characterized by a different dominant frequency and the series of wavelets preferably arranged according to ascending or descending order of dominant frequency. For convenience, the wavelets utilized during decomposition are referred to herein as decomposing wavelets.

In accordance with a preferred embodiment, a linear program is established for decomposing the original seismic data trace (Step 314). This requires, initially, the generation of a wavelet vector, which is illustrated by FIG. 3A. A wavelet vector is a time series digital array that contains, at a certain time position, only one single wavelet. A wavelet vector may be created by: (1) setting all elements of a time series digital array to zero, (2) placing a wavelet at a desired time position with respect to the time series digital array, and then, (3) combining the time series array with the positioned wavelet array. The result is a wavelet vector/array with the single wavelet at the desired time position. It should be understood that the generation of a wavelet and the evaluation and/or analysis of wavelets are preferably performed through use of a computer.

The solution of the linear program provides the set of wavelets that optimally represents the original seismic data trace. With the decomposing wavelets selected and provided in the wavelet base, the linear program is established for the original seismic data trace, as follows:

Minimize: CX

Subject to: AX=B and X>=0, where X is the vector of variables to be solved for, C are the weights of wavelet vectors for X, matrix A is composed of columns of wavelet vectors and vector B is the seismic data trace vector to be decomposed.

The wavelet vectors are generated by taking each wavelet in the wavelet base and positioning the wavelet at different time positions. Matrix A comprises all of the wavelet vectors, wherein each wavelet vector provides one column of Matrix A. The expression "CX" is called an objective function, where C represents a vector of weights for the corresponding wavelet vectors in matrix A. The linear program is then solved (Step 316) using, for example, a linear optimization method such as the interior point approach. A suitable interior point method is described in Ross, C., Terlaky, T. and Vial, J.-Ph, 1997, Theory and Algorithms for Linear Optimization, John Wiley & Sons.

The expression X represents the solution that minimizes the objective function CX and is the vector containing the amplitudes of the corresponding wavelet columns or the corresponding time position of the wavelets. The vector X is preferably recorded after records corresponding to wavelets of zero amplitude are discarded. It should be appreciated that the criteria for discarding wavelets may be based on a certain threshold other than zero amplitude. For example, only wavelet vectors with amplitudes that are larger than a certain amplitude threshold may be retained. The wavelets, wavelet amplitudes, and wavelet time positions for these wavelet vectors are preferably stored in a computer file (Step 318). Information may also be stored for recovering the discarded wavelet vectors and/or the wavelet vector parameters. It should be appreciated that the discarded wavelet vectors may be useful in other related seismic evaluations and/or data processing techniques.

Each saved wavelet has, at least, three parameters saved therewith: (1) amplitude of the wavelet, (2) time position corresponding to the original seismic data trace, and (3) wavelet type and dominant frequency which can be used to recover the shape of the wavelet from the original wavelet base. The time position values range, of course, from the beginning of the decomposed seismic trace to the end of the decomposed seismic trace.

Reconstruction

Figure 3B:
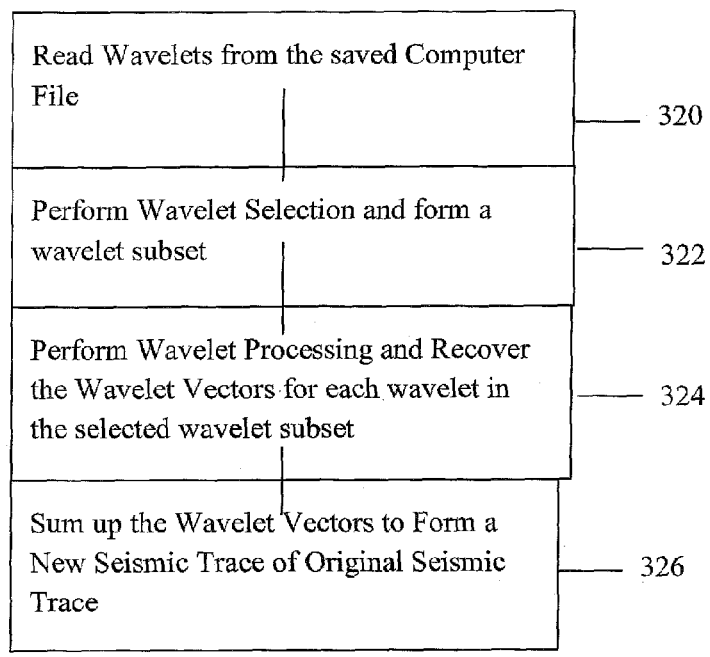
FIG. 3B is a flow diagram of an exemplary sub-process of reconstructing a seismic trace.
Figure 3C:
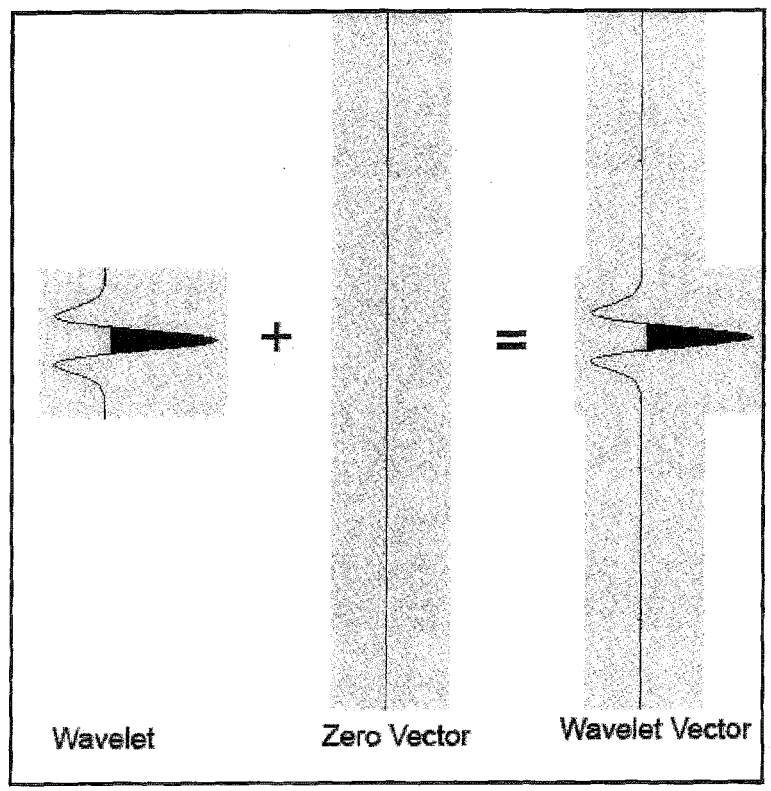
FIG. 3C illustrates an exemplary sub-process of generating a wavelet vector.

FIG. 3B represents, in simplified form, an exemplary sub-process of reconstructing a seismic data trace. It should be appreciated that, although the steps described herein may be preferable, the exact order illustrated may be altered and other steps may be included or deleted. This exemplary sub-process of the overall method should not, therefore, be construed to limit the invention.

First, the wavelets saved in step 318 of FIG. 3A, are read from the computer file. (Step 320) At Step 322, a subset of the read wavelets is selected. The wavelet selection criteria may be based on a variety of preferential factors such as, but not limited to, time position of the wavelets, dominant frequencies of the wavelets, or both time position and dominant frequencies of the wavelets. In other embodiments, all of the wavelets are selected for use in reconstruction. In one example, an original seismic data trace is reconstructed by selecting and using all of the decomposition wavelets in the saved computer file in step 318 of FIG. 3A. The reconstructed seismic trace becomes essentially the same as the original seismic data trace. In any event, another wavelet subset is selected as deemed suited for the ultimate interpretive technique and the objective of the interpretation.

FIG. 4 illustrates an original seismic section of 30 seismic data traces. This seismic section is decomposed and the decomposed wavelets or sets of wavelets are saved to a computer file.

Figures 4B, 4C:
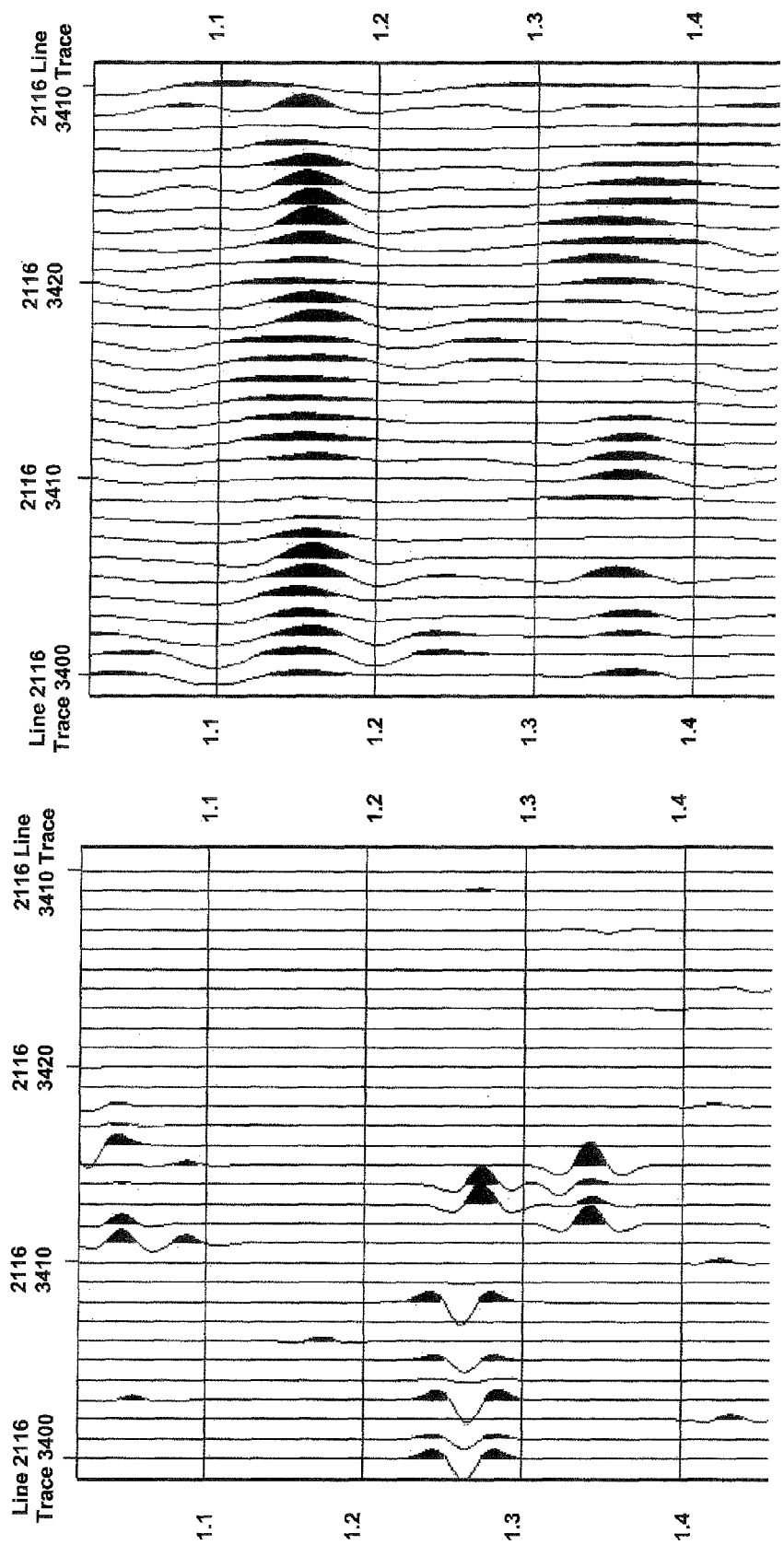
FIG. 4B illustrates a reconstructed seismic section with wavelets of 21 Hz dominant frequency.
FIG. 4C illustrates a reconstructed seismic section with wavelets of 1-10 Hz dominant frequency.
Figures 4D, 4E:
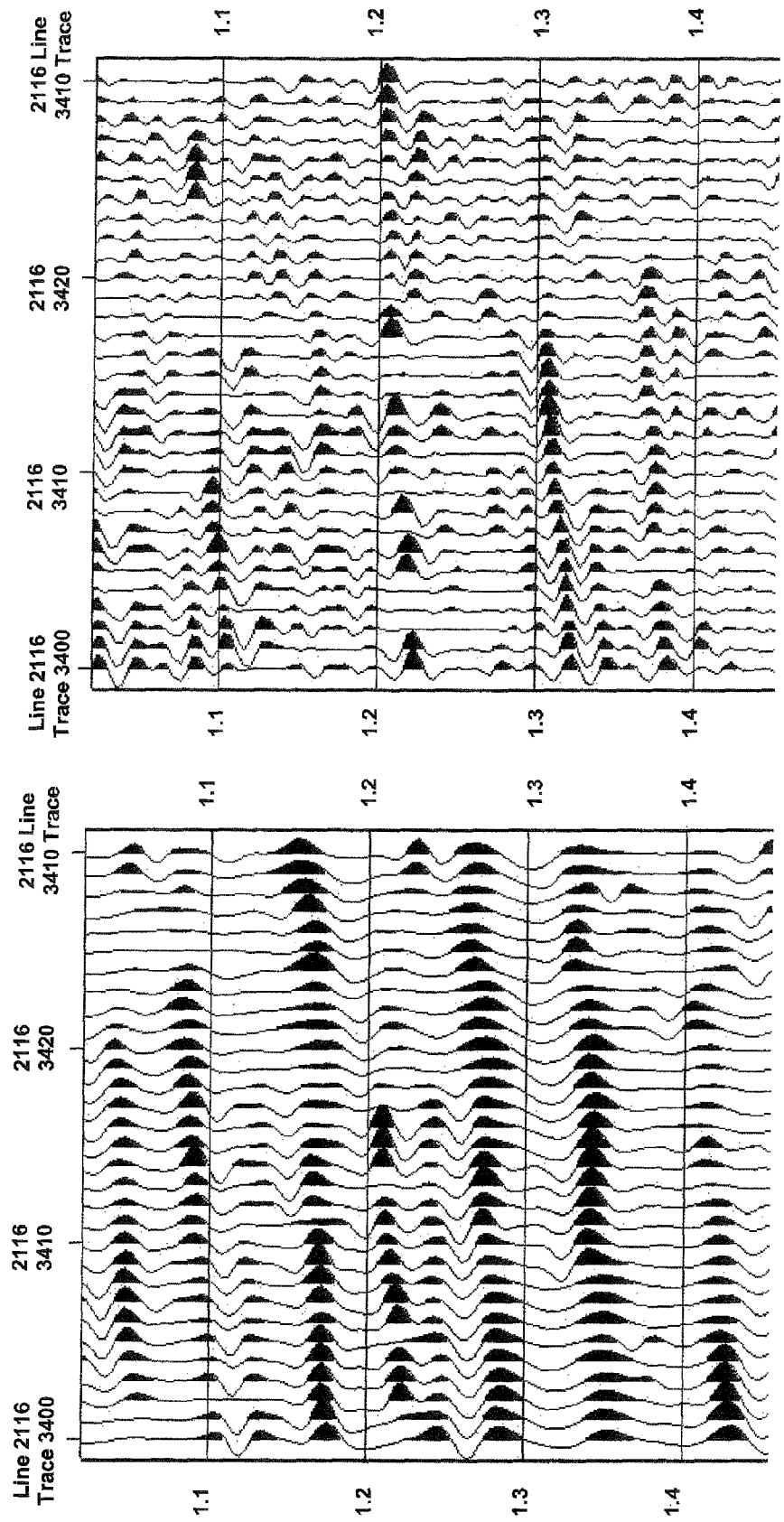
FIG. 4D illustrates a reconstructed seismic section with wavelets of 10-30 Hz dominant frequency.
FIG. 4E illustrates a reconstructed seismic section with wavelets of 30-75 Hz dominant frequency.
Figure 4F:
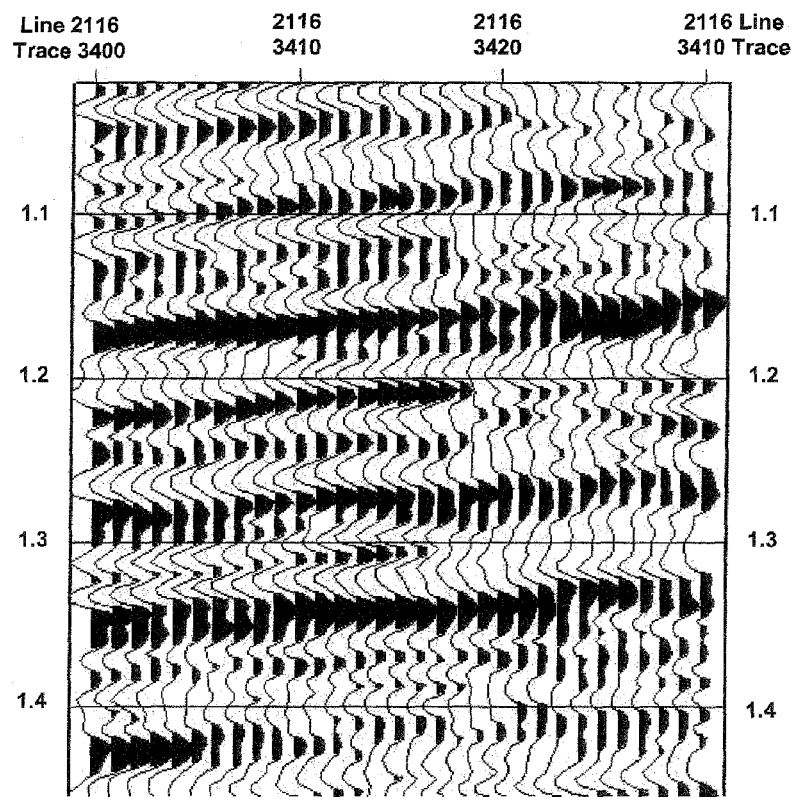
FIG. 4F illustrates a reconstructed seismic section with all saved wavelets.

FIGS. 4A-4F illustrate various exemplary seismic sections reconstructed with decomposition wavelets selected based on dominant frequencies. FIG. 4A is reconstructed with a wavelet subset of only wavelets of 20 Hz dominant frequency. FIG. 4B is reconstructed with a wavelet subset of only wavelets of 21 Hz dominant frequency. FIG. 4C is reconstructed with a wavelet subset of wavelets of 1-10 Hz dominant frequencies. FIG. 4D is reconstructed with a wavelet subset of wavelets of 10-30 Hz dominant frequencies. FIG. 4E is reconstructed with a wavelet subset of wavelets of 30-75 Hz dominant frequencies. FIG. 4F is reconstructed with all saved wavelets and it is actually a very accurate representation of the original seismic data traces in FIG. 4.

At further step 324, the selected wavelets are preferably presented for further processing and for various purposes of use. Then, the wavelet vectors for wavelets of the selected subset are recovered with the information from the saved computer file. At step 326, the recovered vectors are summed to form a new seismic data trace. It should be appreciated that, when all wavelets are selected, the new seismic trace is basically the same as the original seismic trace. A new seismic data trace is constructed when part of or a subset of the wavelets is selected.

Depending on the purpose for which the reconstructed seismic data will be used, interactive programs may be used to facilitate wavelet selection and to readily view resulting reconstructed seismic sections. This allows the user to immediately view the result of a wavelet selection. In this way, the user may use the interactive programs to find (and select), for example, a wavelet range that is well suited for revealing fault point and/or other seismic events of interest. For example, in a reservoir prediction application, a wavelet selection may be made that maximizes the difference of the reconstructed seismic data traces at an oil/gas producing well from the reconstructed seismic data traces at a dry well, so as to differentiate between an oil/gas producing well and a dry well.

In another aspect, suitable computer programs are employed to implement evaluation, analysis, and iterative processes, and to facilitate identification of noise wavelets among other wavelets. Thus, the instant method provides a means of decomposing a seismic data trace into a set of wavelets; then selecting the wavelets to reconstruct a new trace while simultaneously removing the noise wavelets.

Exemplary Application

The following describes an exemplary application according to one aspect of the invention:

1) Upon receipt and input of an original seismic data trace, a wavelet type or combination of wavelet types is selected for decomposition. For the present example, Ricker wavelets having dominant frequencies in the range of 1 Hz to 75 Hz are included as the decomposition wavelets for the wavelet base (noting that the actual frequency content is much wider than the selected range). Generally, the interval of the dominant frequencies can be made smaller to achieve higher accuracy of decomposition and, larger, for faster decomposition computation. An interval of 1 Hz is used in the examples below. It should be understood that the minimum and/or maximum dominant frequency of the selected wavelets may correspond to the minimum and/or maximum dominant frequency of the actual (original) seismic data trace.

2) Wavelet positions in wavelet vectors:

Supposing there are N amplitude samples in the seismic data trace. For each decomposing wavelet, N wavelet vectors are built. Each wavelet vector corresponds to one amplitude sample of the seismic data trace and contains only one wavelet that is positioned at the position of its corresponding amplitude sample of the seismic data trace. If there are M decomposition wavelets in the wavelet base, the number of wavelet vectors or columns provided in matrix A is N multiplied by M or N*M.

3) Negative wavelet vectors:

To satisfy the condition of linear program X>=0, each of the above N*M wavelet vectors is multiplied by −1 and then is added to the matrix A. The number of columns of matrix A becomes 2*N*M.

4) Wavelets positioned at maximum positions:

Positions of the analytical maximums of the amplitude samples of the seismic data trace are computed. These positions may not fall exactly on the positions of the amplitude samples of the seismic data trace. For each maximum position, wavelet vectors are created for each decomposing wavelet and positions of the wavelets in the generated wavelet vectors are corresponding to the maximum positions of the seismic trace. If the number of the maximum positions of the seismic data trace is L, the number of columns of matrix A becomes (2*N*M)+(L*M).

5) Wavelets positioned at minimum positions:

Positions of the analytical minimums of the amplitude samples of the seismic data trace are computed. These positions may not fall exactly on the positions of the amplitude samples of the seismic data trace. For each minimum position of the seismic data trace, wavelet vectors are created for each decomposing wavelet and their wavelet positions of the created wavelet vectors are corresponding to the minimum positions of the seismic trace. If the number of the minimum positions of the seismic data trace is S, the number of columns of matrix A becomes (2*N*M)+(L*M)+(S*M).

6) Weights of wavelet vectors for decomposition:

Vector C in the linear program described above is composed of weights of the corresponding columns of the wavelet vectors. The equal weight of 1 is used in the examples below.

Exemplary Decomposition and Reconstruction Using a Synthetic Seismic Trace

Figure 5:
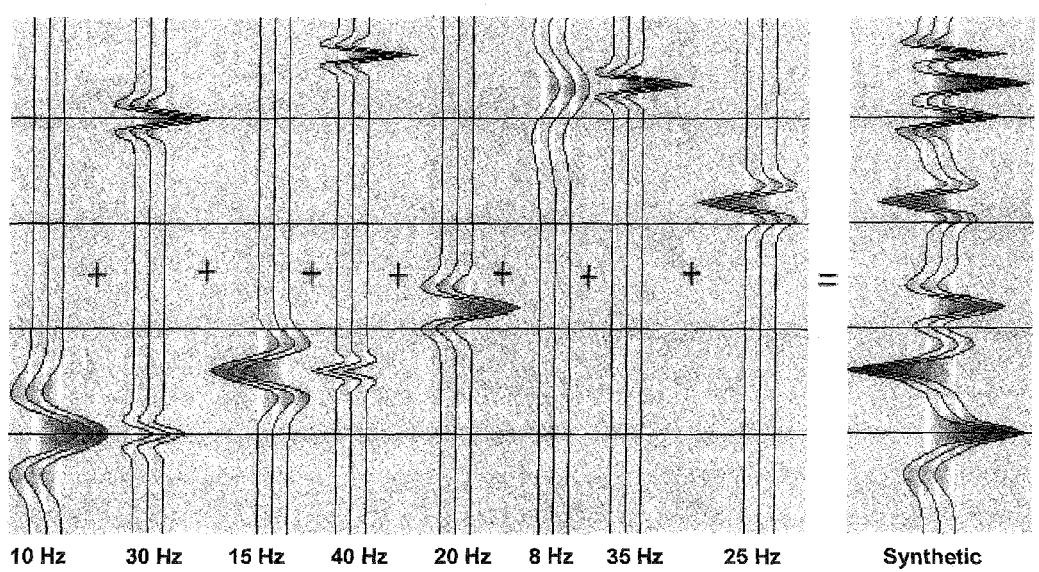
FIG. 5 illustrates the composition of a synthetic seismogram.

FIG. 5 shows all the Ricker wavelets that are used to compose a synthetic seismogram. The dominant frequencies of the Ricker wavelets range from 8 Hz to 40 Hz. The amplitudes of the wavelets are either 1.0 or 0.5. Some wavelets of different dominant frequencies overlap with each other. On the far right of FIG. 5, the resulting synthetic seismogram is shown.

Figure 6:
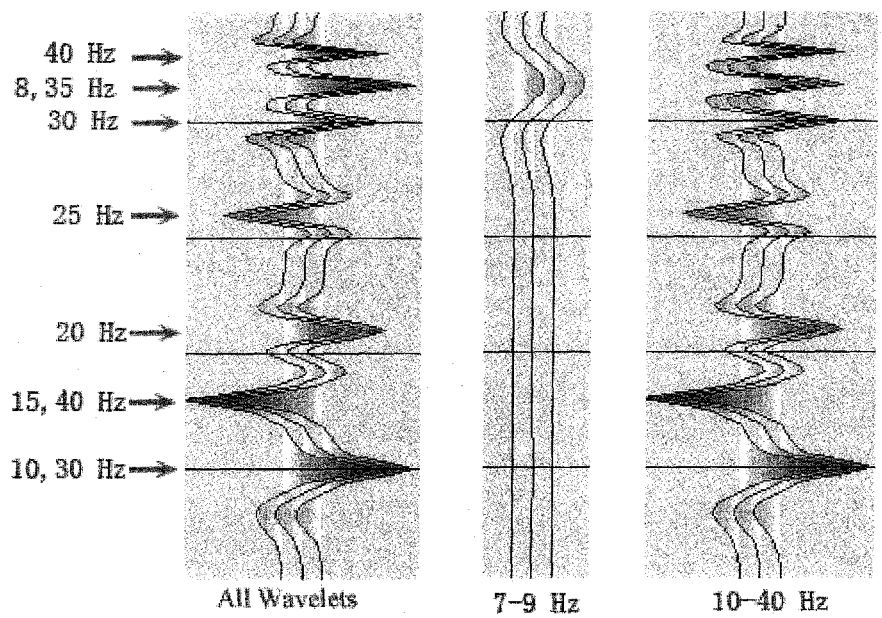
FIG. 6 illustrates reconstruction with all wavelets, wavelets of 7-9 Hz, and wavelets of 10-40 Hz.

Next, the synthetic seismogram is decomposed in accordance with the present inventive method. In this example, the decomposing wavelets selected are Ricker wavelets of dominant frequencies ranging from 1 Hz to 75 Hz. To view what wavelets are in the set of wavelets, selective reconstruction of the synthetic seismogram is performed. FIG. 6 illustrates reconstruction using all wavelets, wavelets of dominant frequencies of 7-9 Hz, and wavelets of dominant frequencies 10-40 Hz. The annotations on the left of the chart show the position of the original composing wavelets and dominant frequencies of the wavelets. The annotations at the bottom show the dominant frequency range of the wavelets used to reconstruct the trace above them. The reconstruction with all wavelets is basically the same as the original synthetic seismogram input. The reconstruction with wavelets of dominant frequencies of 7-9 Hz is very close to the wavelet of dominant frequency of 8 Hz. The reconstruction with wavelets of dominant frequencies 10-40 Hz is essentially the synthetic seismogram without the wavelet of dominant frequency of 8 Hz.

Figure 7:
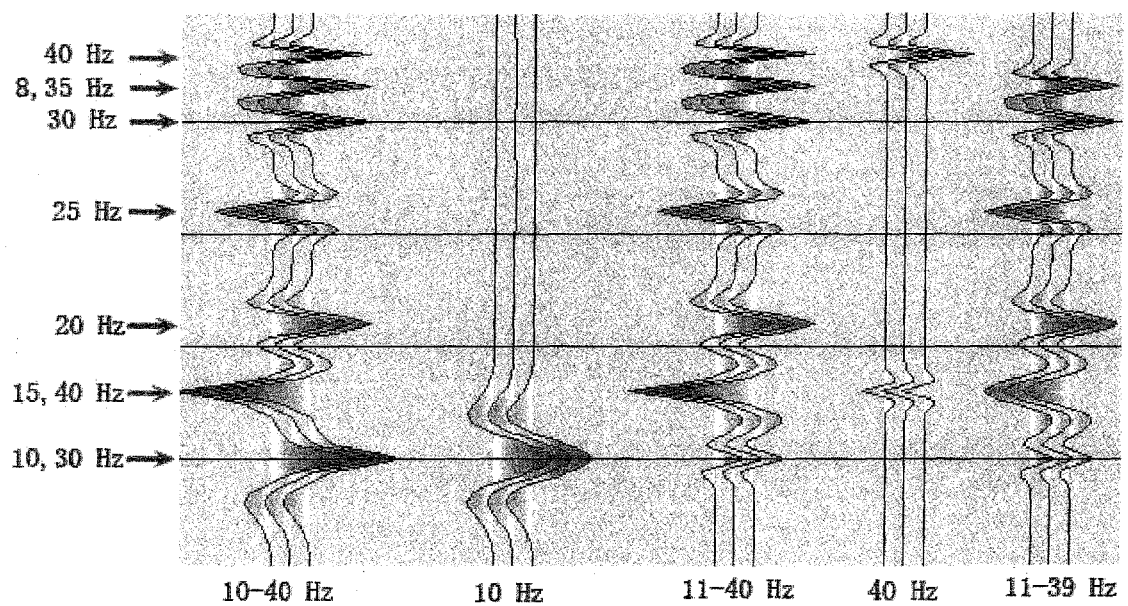
FIG. 7 illustrates removal of 10 and 40 Hz wavelets and reconstruction without the 10 and 40 Hz dominant frequency wavelets.

FIG. 7 illustrates the removal of wavelet of dominant frequencies of 10 Hz and 40 Hz from the seismogram. The reconstruction with only wavelets of dominant frequency of 10 Hz is basically the same as the wavelet of dominant frequency of 10 Hz that was used to compose the synthetic seismogram. The reconstruction with wavelets of dominant frequencies from 11 to 39 Hz effectively removes the wavelets of dominant frequencies of 10 and 40 Hz from the synthetic seismogram.

Figure 8:
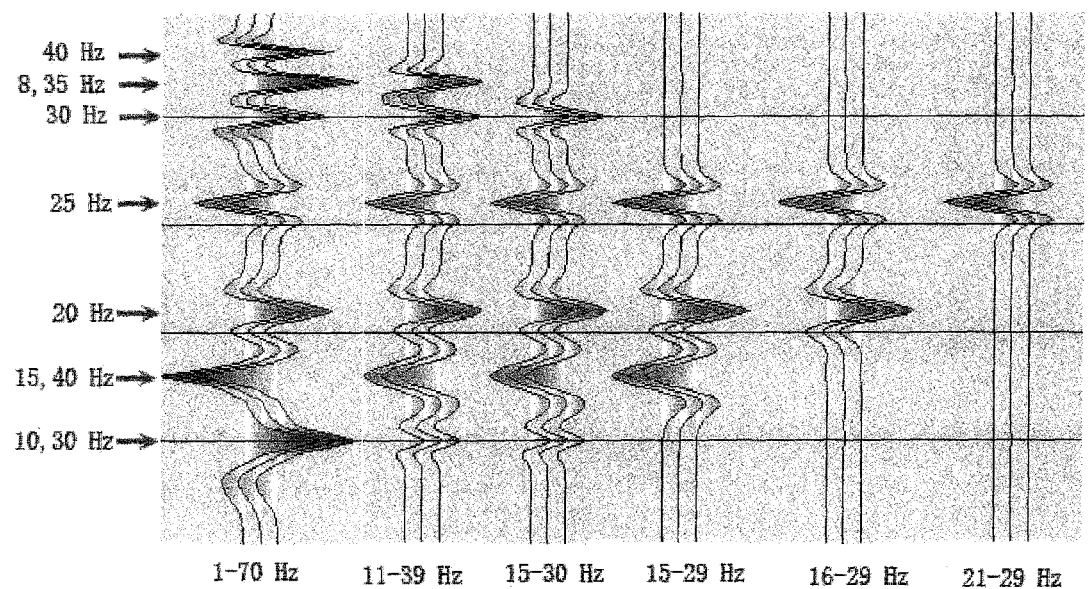
FIG. 8 illustrates various reconstructions with wavelets of various dominant frequencies.

FIG. 8 illustrates various reconstructions to illustrate accurate decomposition. Continuing the selective reconstruction, all the wavelets of various dominant frequencies that were originally used to compose this synthetic seismogram can be divided accurately.

Exemplary Decomposition and Reconstruction Using a Real Seismic Section

FIG. 4 is the original seismic section of thirty seismic traces. The seismic data traces are first decomposed using the method described above. Then, some seismic sections are reconstructed with different wavelet subsets. FIGS. 4A-4F show some examples of seismic sections reconstructed using various dominant frequency range. The decomposing wavelets for all these examples are Ricker wavelets. In preferred embodiments, the method of processing, according to the invention, is amended to include steps or sub processes that improve the resulting reconstructed seismic data trace. In certain embodiments, the original seismic data trace is decomposed into a set of wavelets. In a further embodiment, a step of removing noise wavelets from the decomposed wavelets (that result from the decomposing steps) results in a more accurate reconstructed seismic data trace. In another embodiment, a gain function is applied to the set of time-dependent wavelets.

Exemplary Removal of Noise Wavelets by Wavelet Selection for Reconstruction

In certain embodiments of the invention, the systems and methods described above are employed to remove noise from an original seismic data trace and produce a more accurate and/or more easily interpreted reconstructed seismic data trace. In one preferred embodiment, a frequency filtering technique is employed. Based on a Fourier Transform, frequency filtering involves rejecting or removing, from the original seismic data trace, certain frequency content outside a frequency pass gate. Frequency filtering may be employed to attenuate the noise in a seismic data trace if the frequency content of the signal is not significantly overlapped with the frequency content of the noise, and the frequency content of the noise is largely outside the frequency pass gate. The technique attenuates the signal, however, to some extent because the frequency content of the noise, in most cases, overlaps with the frequency content of the signal.

In one aspect, a method is established wherein noise wavelets are removed from a seismic data trace, thereby greatly increasing the signal to noise ratio of the seismic data. First, the seismic data trace is decomposed, as before, into a set of wavelets of different shapes. Next, certain wavelets are selected from the set to form a new set of wavelets that contains mostly signal wavelets. This step can also be described as removing noise wavelets from the decomposed set of wavelets to form a new set of wavelets. It should be understood, as disclosed hereinabove, that the selection of wavelets or subsets of wavelets depends on the purpose of reconstruction and purpose for which the reconstructed seismic data will be used. Interactive programs allow the wavelet selection to be made during the seismic data trace reconstruction and thus allow the reconstructed section to be viewed simultaneously during reconstruction. Finally, a new seismic data trace is reconstructed with the new set of wavelets. In accordance with the inventive method, the resulting or intended seismic data traces are characterized by a much higher signal to noise ratio than the original seismic data trace.

Figure 9:
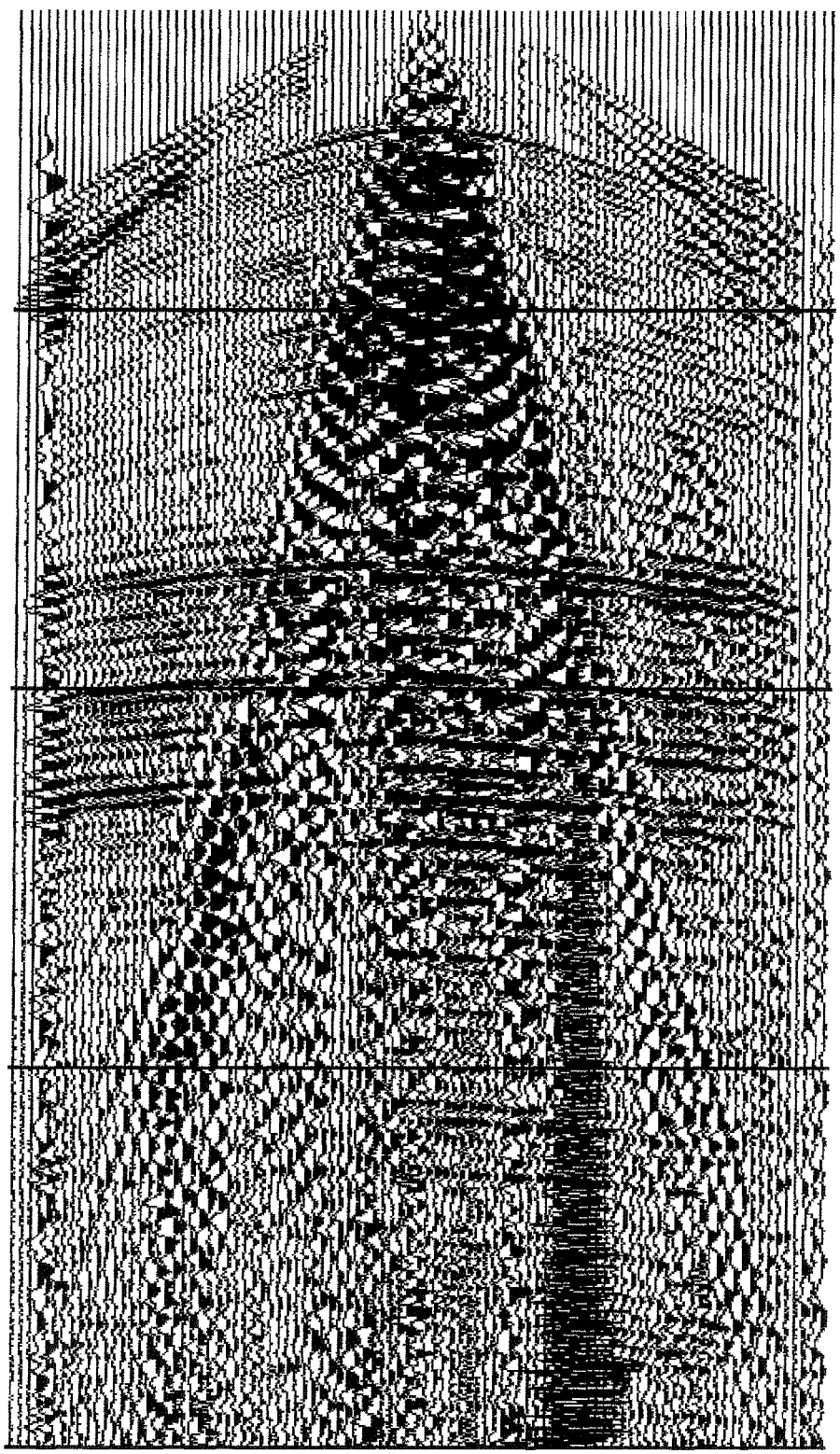
FIG. 9 is a shot gather of seismic traces.
Figure 10:
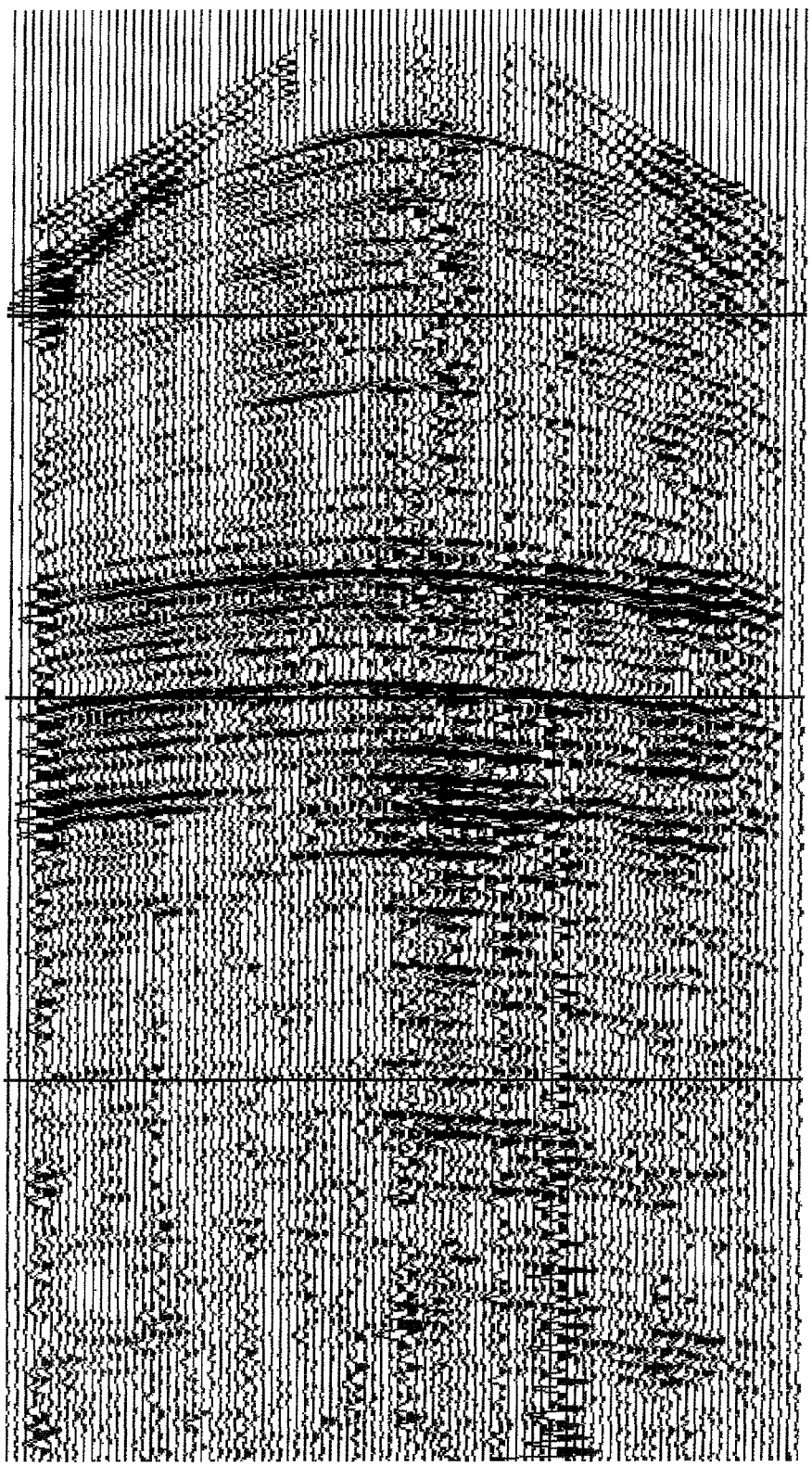
FIG. 10 is a shot gather reconstructed with wavelets of 16-47 Hz dominant frequency.
Figure 11:
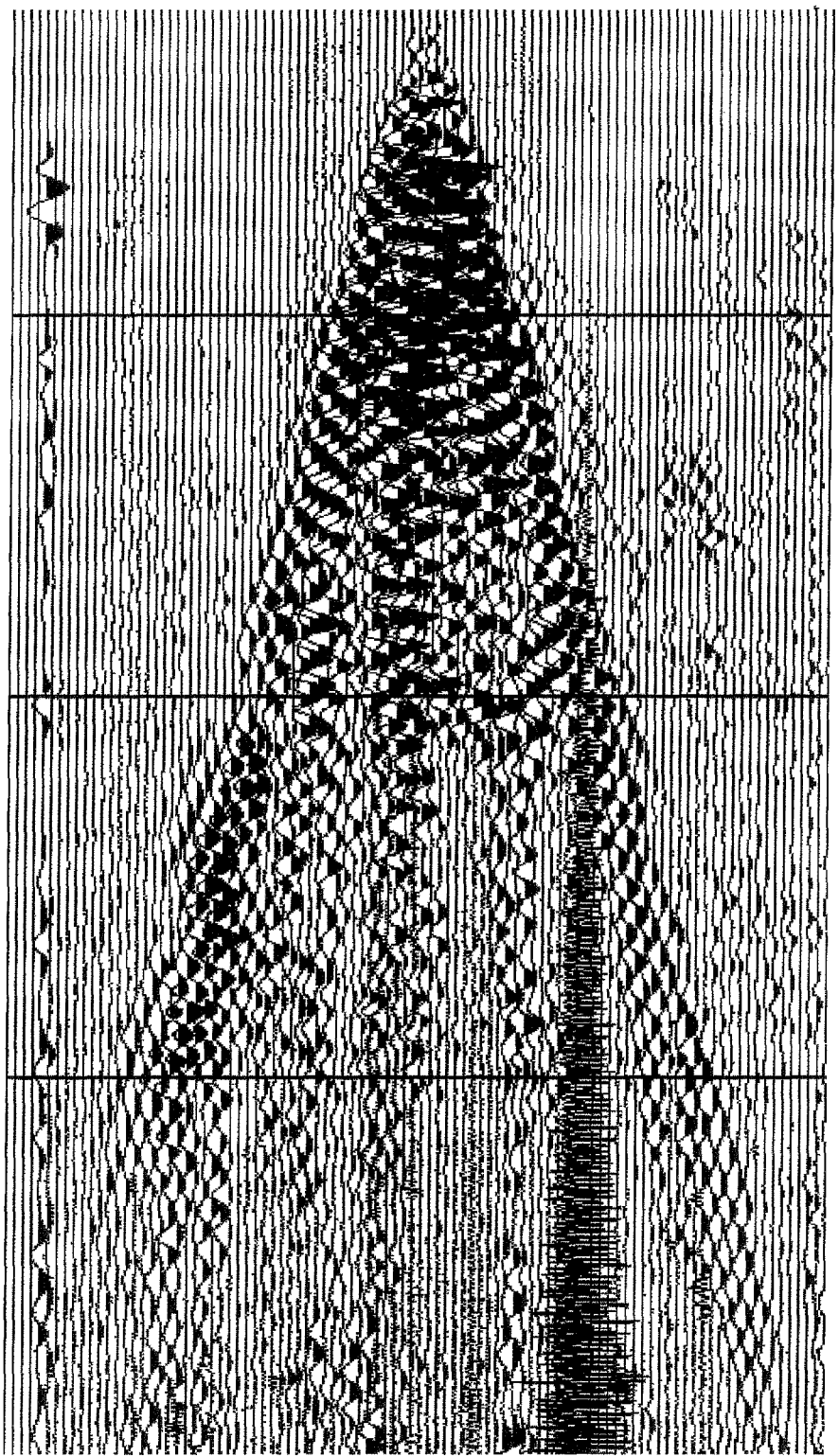
FIG. 11 is a shot gather illustrating the difference between the shot gather of FIG. 9 and the shot gather of FIG. 10.
Figure 12:
FIG. 12 is a shot gather reconstructed with wavelets of 2-15 Hz dominant frequency.
Figure 13:
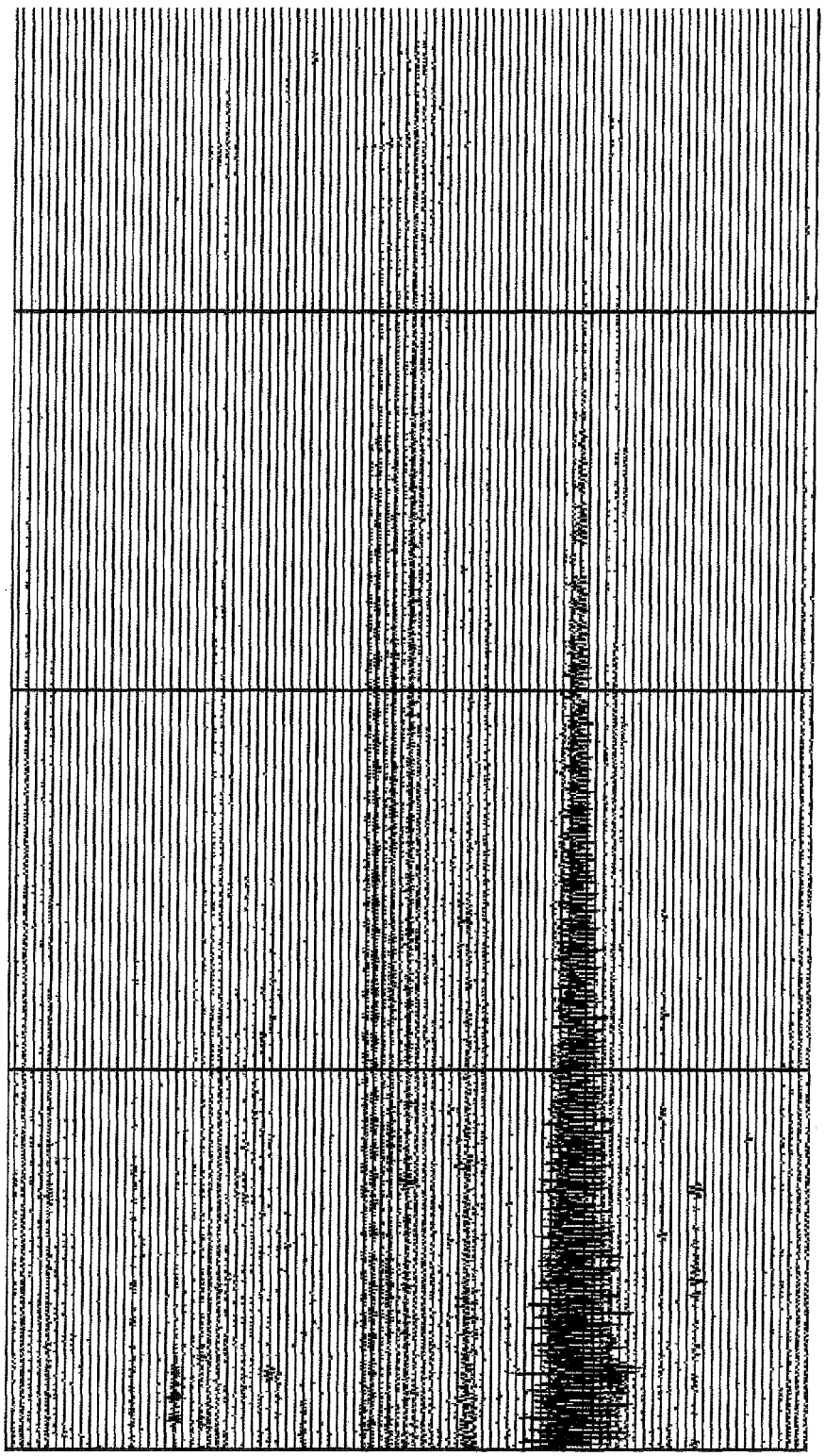
FIG. 13 illustrates is shot gather reconstructed with wavelets of 48-100 Hz dominant frequency.

FIG. 9 illustrates a shot gather of original pre-stack seismic data traces. Low frequency noise and velocity ground roll noise are obvious in the gather. The shot gather also includes high frequency noise. In this particular embodiment, Ricker wavelets of dominant frequencies ranging from 1 to 100 Hz are selected as the decomposing wavelets. In accordance with this preferred embodiment, each seismic data trace in the shot gather is decomposed into a set of Ricker wavelets. A subset of the Ricker Wavelets is then selected based on certain dominant frequency criteria. FIG. 10 illustrates the reconstruction of the seismic data trace using the wavelets of dominant frequencies from 16 to 47 Hz. This reveals that much of the noise is removed from the seismic data traces. FIG. 11 illustrates the difference between the seismic traces in FIG. 9 and those of FIG. 10. It can be seen that almost no signal is removed from the seismic traces. FIG. 12 illustrates a reconstruction of the seismic traces using wavelets of dominant frequencies between 2 to 15 Hz. It shows the low frequency ground roll noises that are removed from the original shot gather (FIG. 9). FIG. 13 illustrates a reconstruction using wavelets of dominant frequencies from 48 to 100 Hz. Here, it shows the high frequency noises that have been effectively removed from the original seismic data traces.

Figure 14:
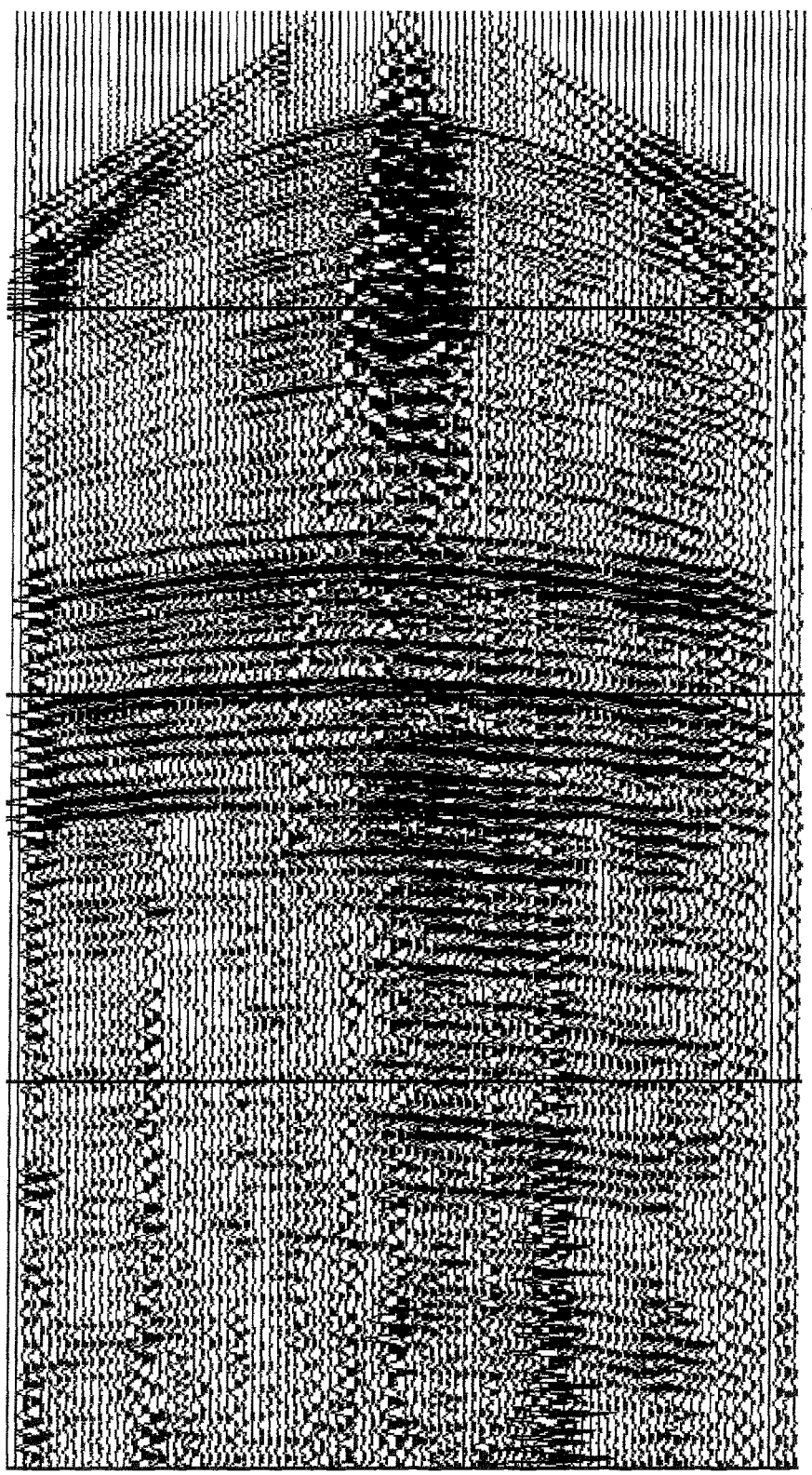
FIG. 14 is a shot gather illustrating the result of band pass (11, 16-47, 52) filtering.
Figure 15:
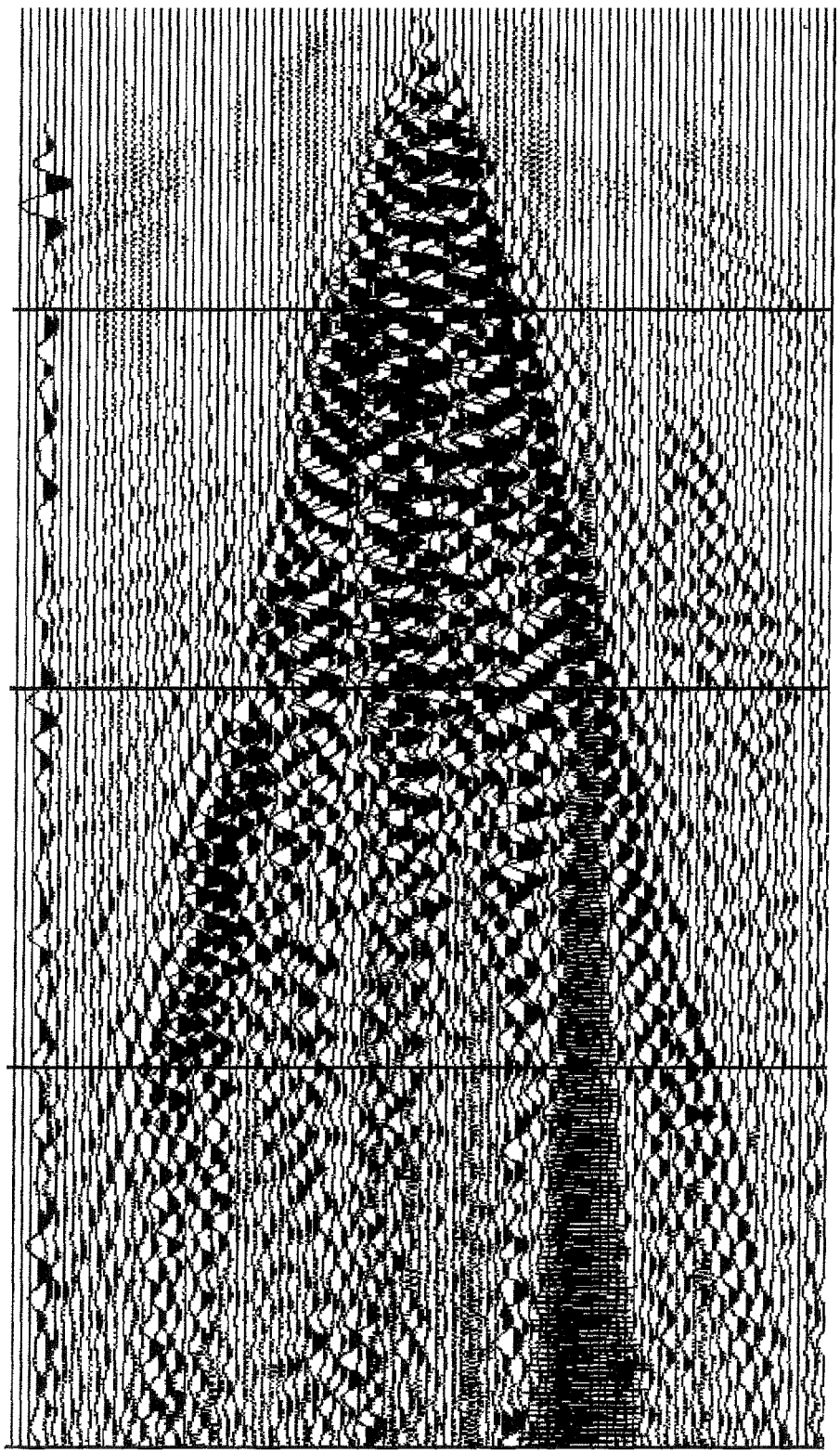
FIG. 15 is a shot gather illustrating the difference of original (FIG. 9) from band pass filtering (FIG. 14)

In the conventional frequency filtering approach, FIG. 14 illustrates the result of band pass filtering with frequency band 11, 16-47, 52 Hz. It illustrates the ground roll noise being attenuated but not well removed. FIG. 15 illustrates the difference between original data before filtering (FIG. 9) and those after filtering (FIG. 14). As expected, some of the signals are also removed from the seismic traces.

To obtain a similar result of noise removal as wavelet selection (FIG. 10), the frequency filtering bandwidth was reduced to 18, 23-47, 52 Hz. The result is shown in FIG. 16.

Figure 16:
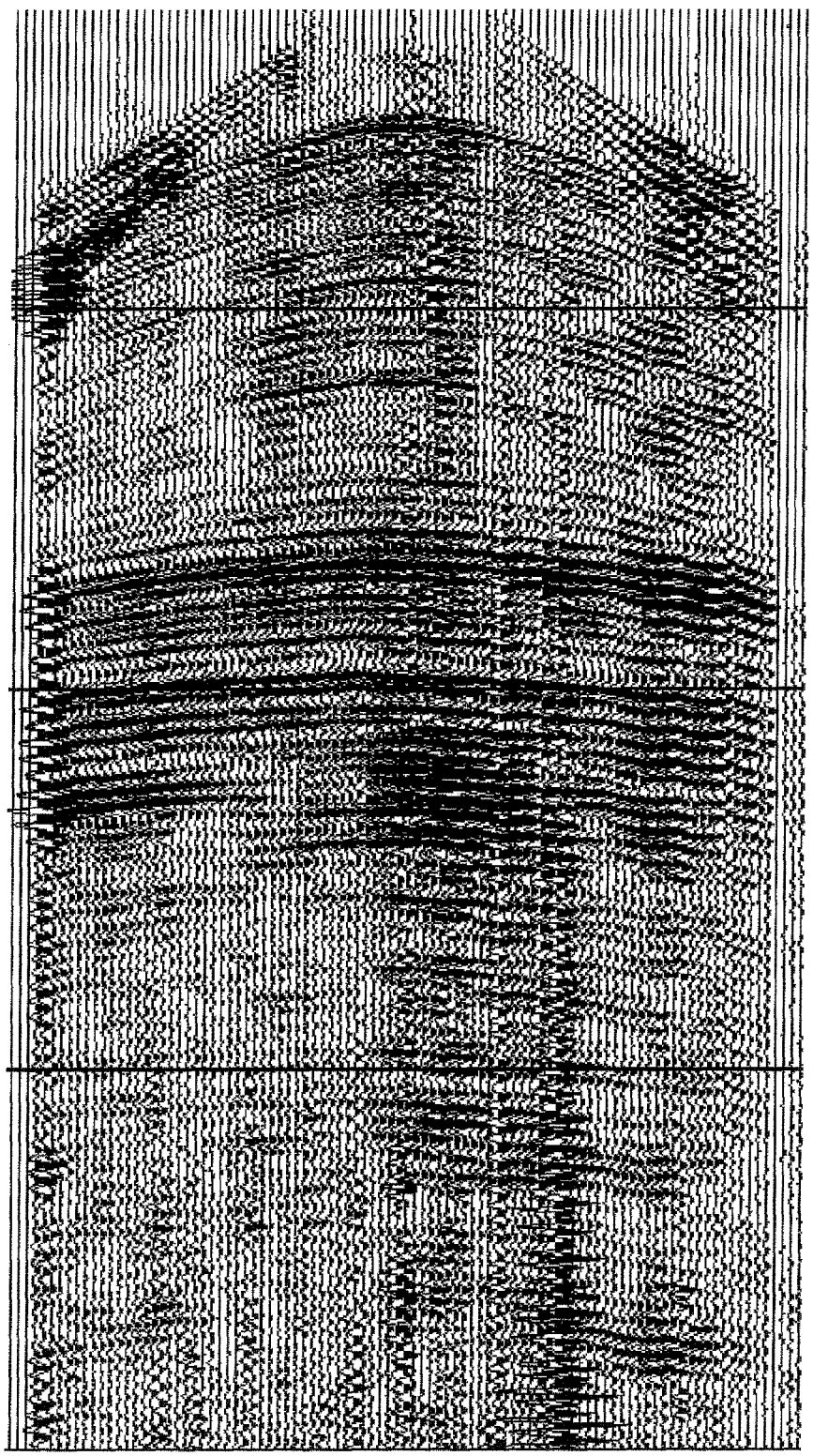
FIG. 16 is a shot gather illustrating the result of band pass (18, 23-47, 52) filtering.
Figure 17:
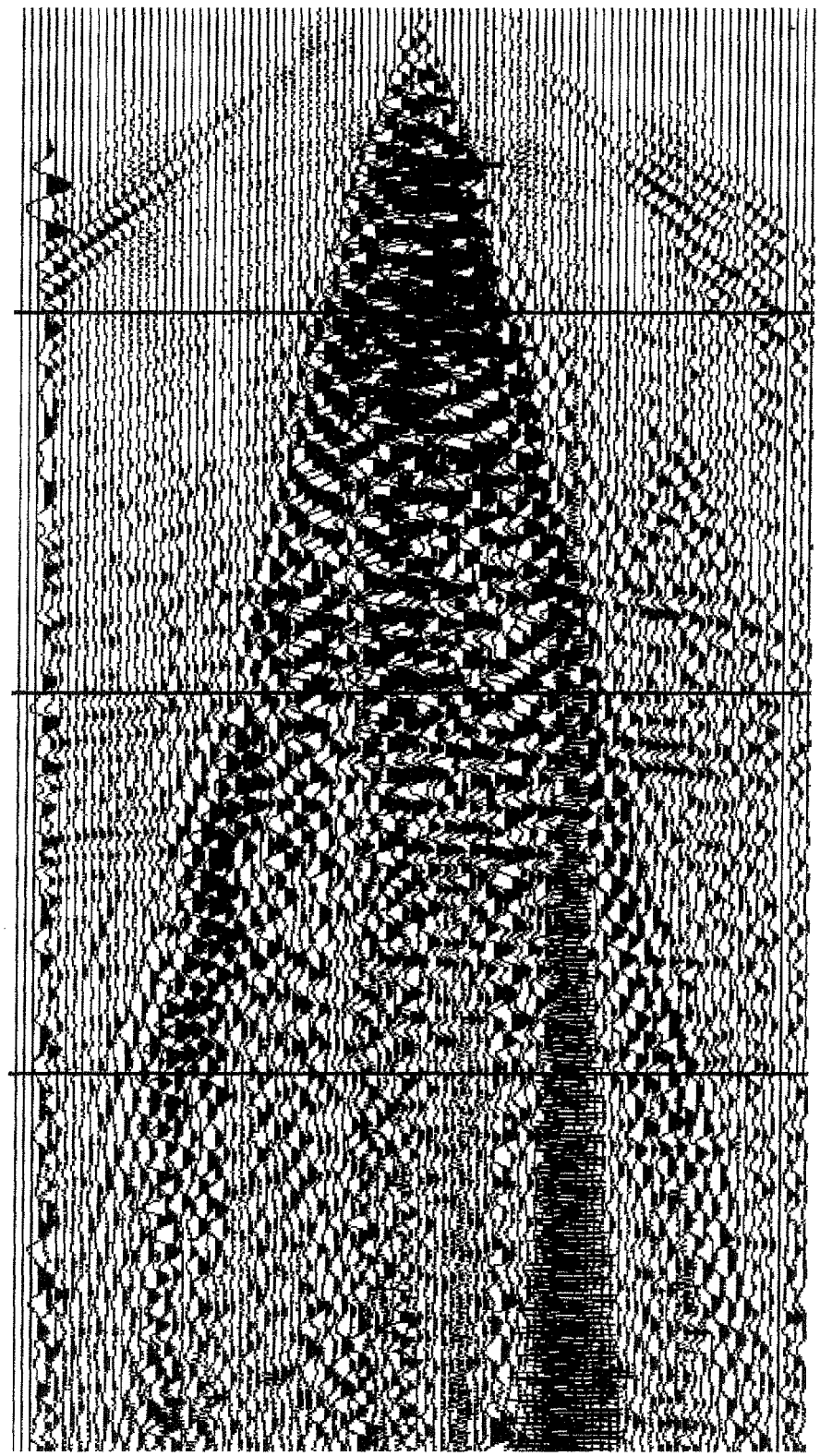
FIG. 17 is a shot gather illustrating the difference of original data (FIG. 9) from band pass filtering (FIG. 16)

FIG. 17 illustrates the difference of the original seismic data (FIG. 9) before filtering from those after filtering (FIG. 16). It can be seen that much signal energy is also removed from the seismic data.

Figure 18:
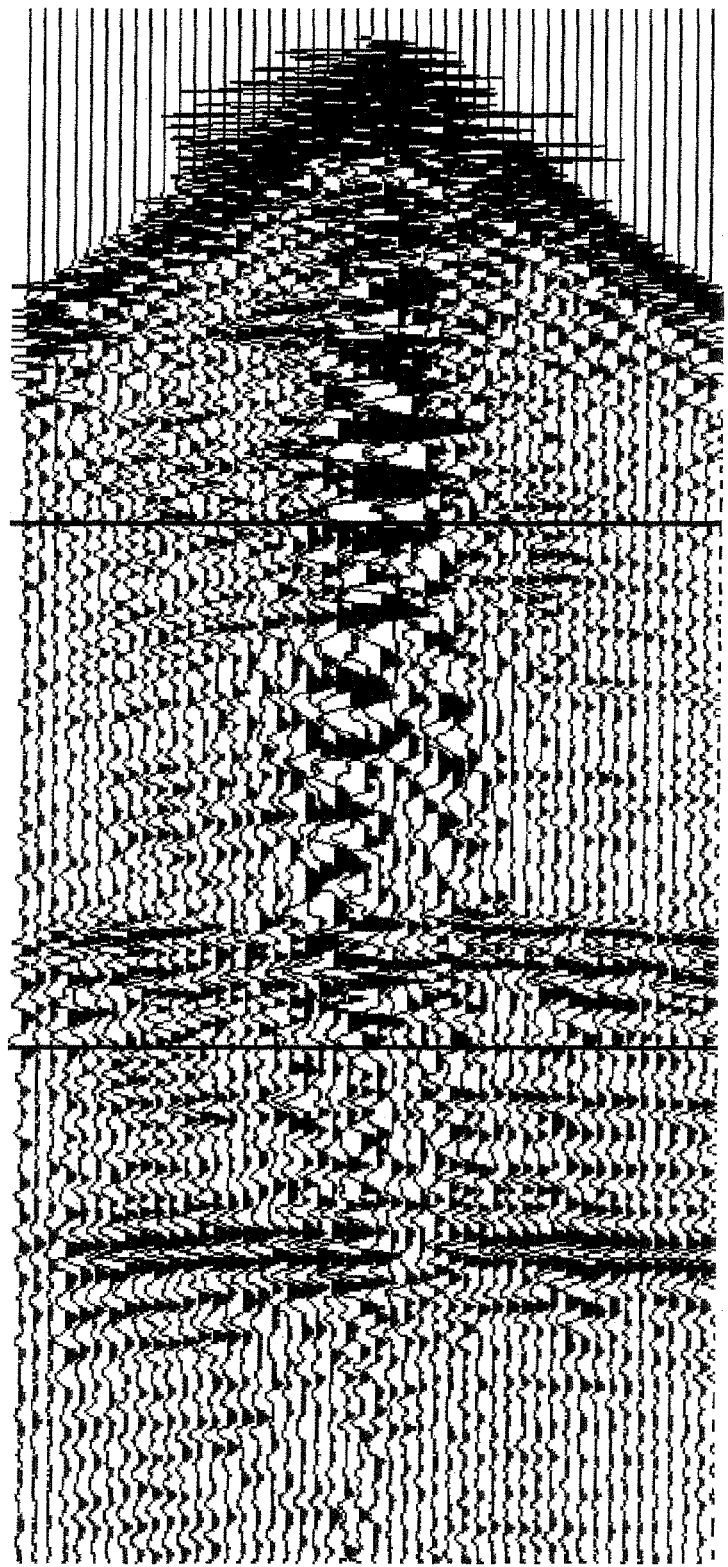
FIG. 18 is a shot gather of seismic data traces with low frequency noises.
Figure 20:
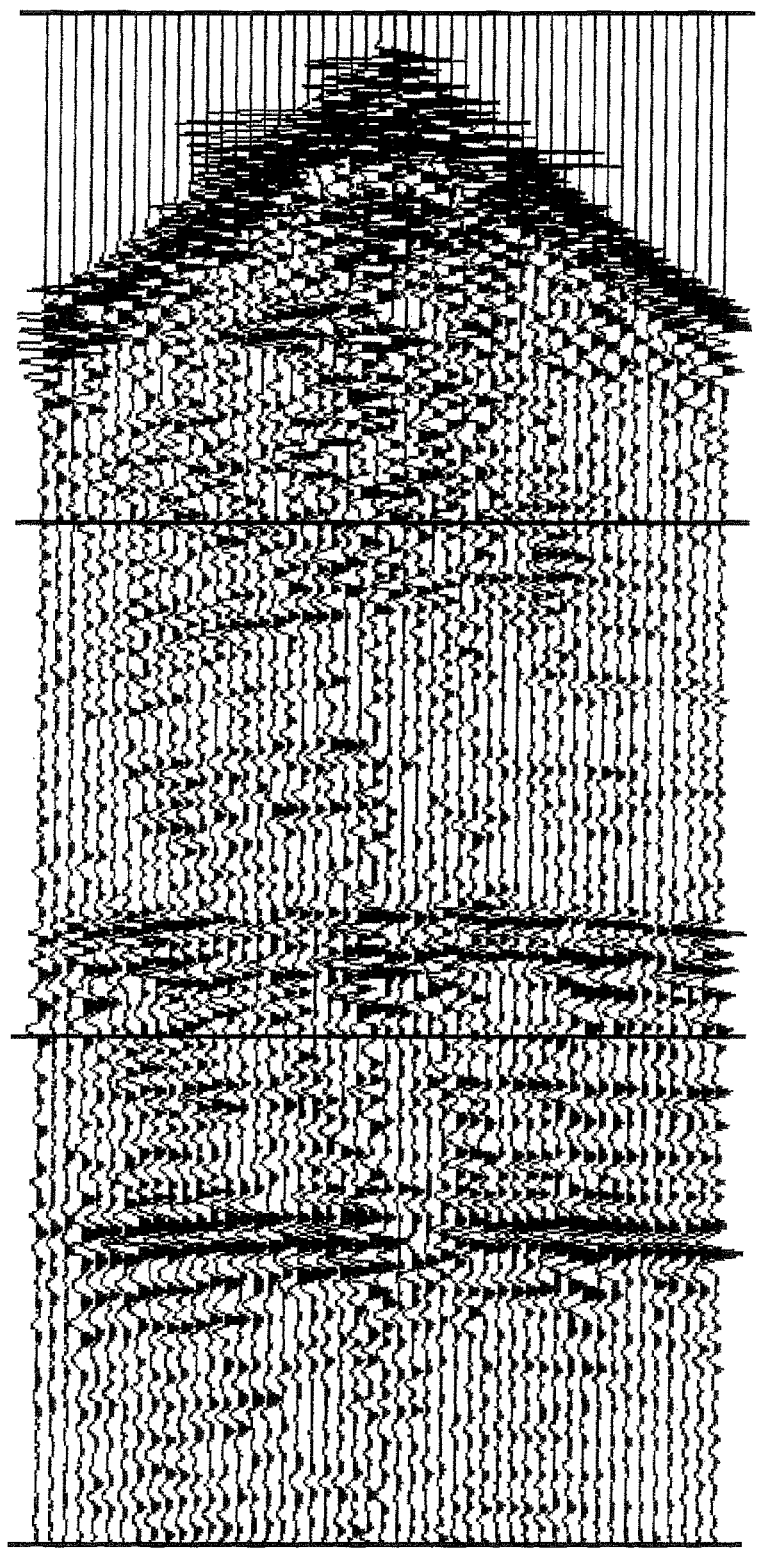
FIG. 20 is a shot gather reconstructed with selected wavelets by polygonal filter (FIG. 19)
Figure 21:
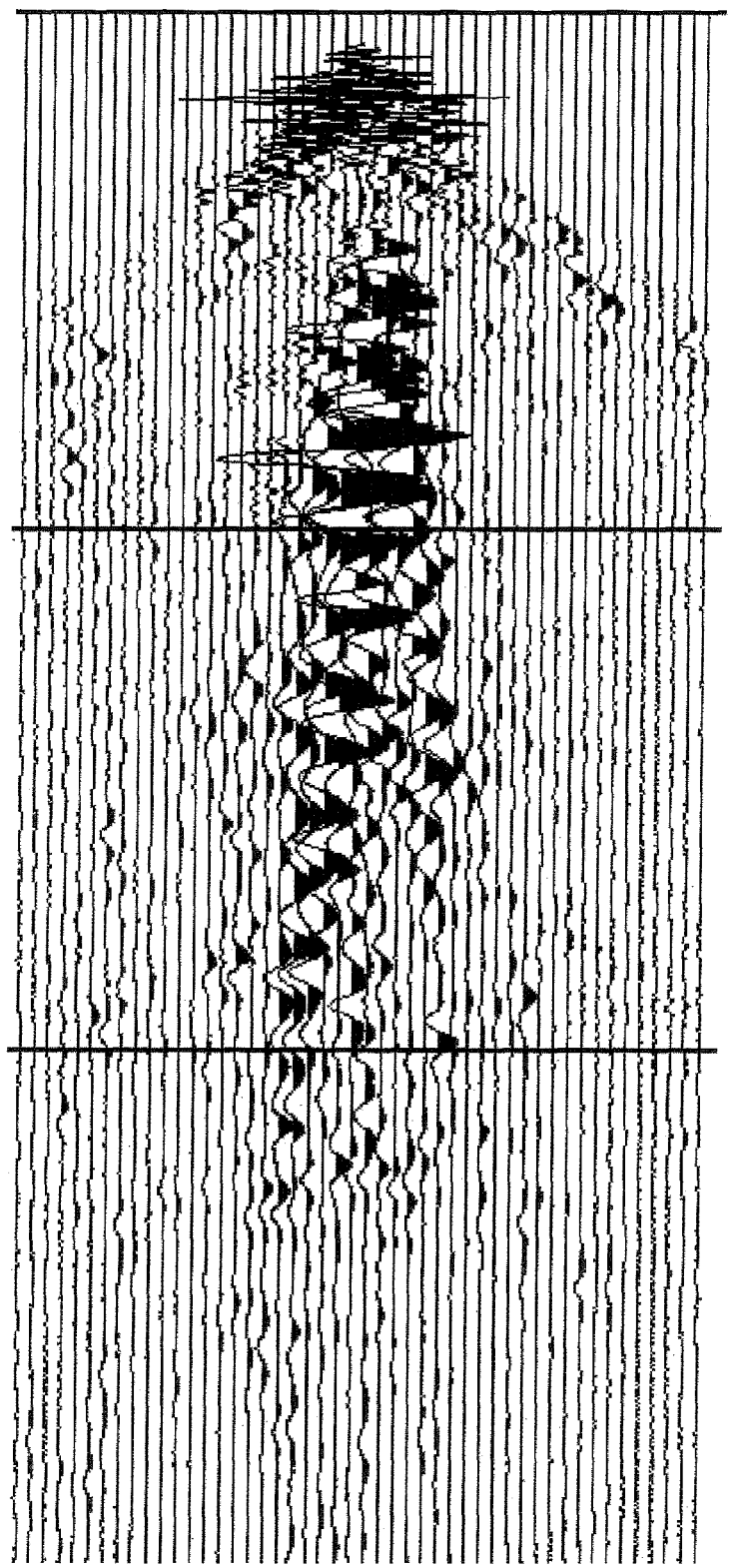
FIG. 21 is a shot gather illustrating the difference between the shot gather of FIG. 22 and the shot gather of FIG. 20.
Figure 19:
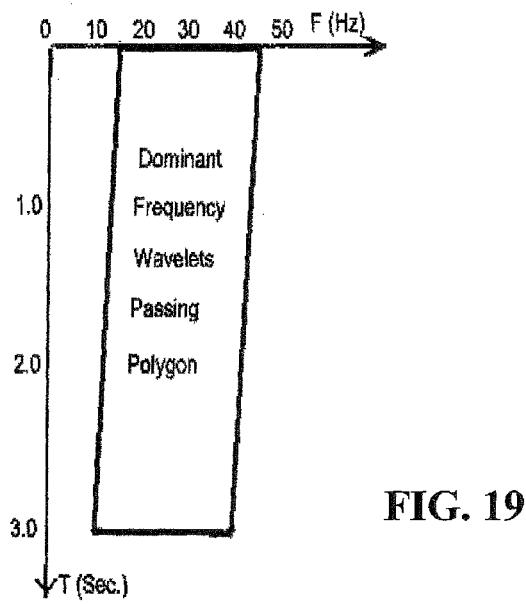
FIG. 19 is a simplified illustration of a polygonal wavelet selection filter in time-frequency domain.

In other applications, a wavelet pass polygon of dominant frequencies can be designed in frequency time domain. The design parameters of the wavelet pass polygon are determined based on the intended purpose for the reconstructed seismic data trace(s) (i.e. similar to the selection of the wavelet selection). Again, interactive programs are used to select the parameters and to allow immediate viewing of the reconstructed data trace. This allows any necessary changes to the parameters of the wavelet pass polygon to be made during the seismic recording period. It should be appreciated that the data can also be recorded and stored for further analysis after the seismic recordings are made. Thus, the various parameters such as, but not limited to, wavelet selection can be adjusted as necessary to provide accurate representation of any type of subsurface formations that are of particular interest. FIG. 18 illustrates an original seismic shot gather with noise of low frequency. FIG. 19 illustrates the dominant frequency wavelet pass polygon in time-frequency domain. Using the dominant frequency polygon to remove the wavelets with dominant frequencies outside of the polygon, a new set of wavelets is generated. New seismic traces of the shot gather may be reconstructed with the new set of wavelets as shown in FIG. 20. It is evident from the Figure that much of the noise has been removed from the original shot gather. FIG. 21 illustrates the difference between the new seismic data traces (FIG. 20) and the original seismic traces (FIG. 18).

Figure 22:
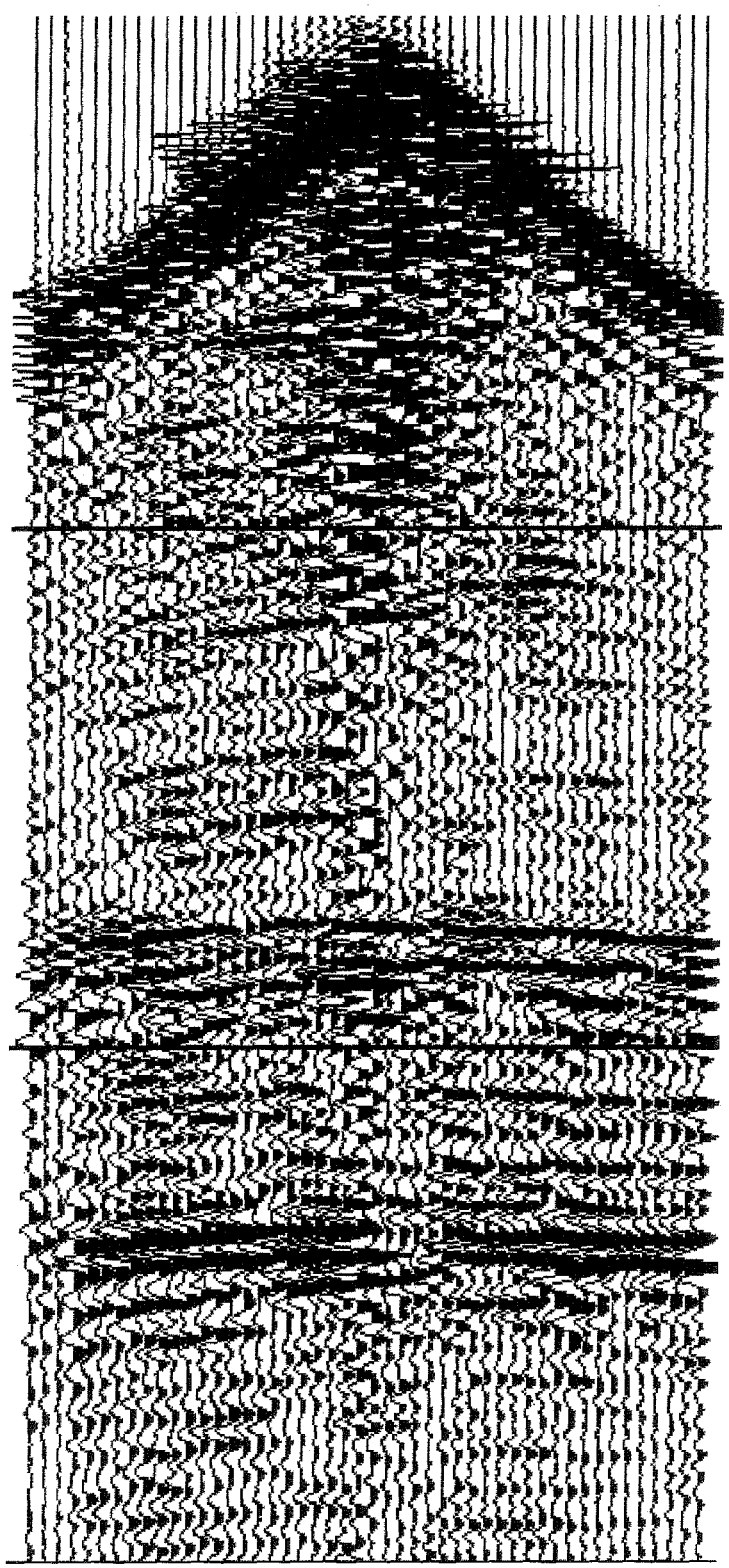
FIG. 22 is a shot gather illustrating the result of band pass filtering with band width 10, 15-35, 40 Hz.
Figure 23:
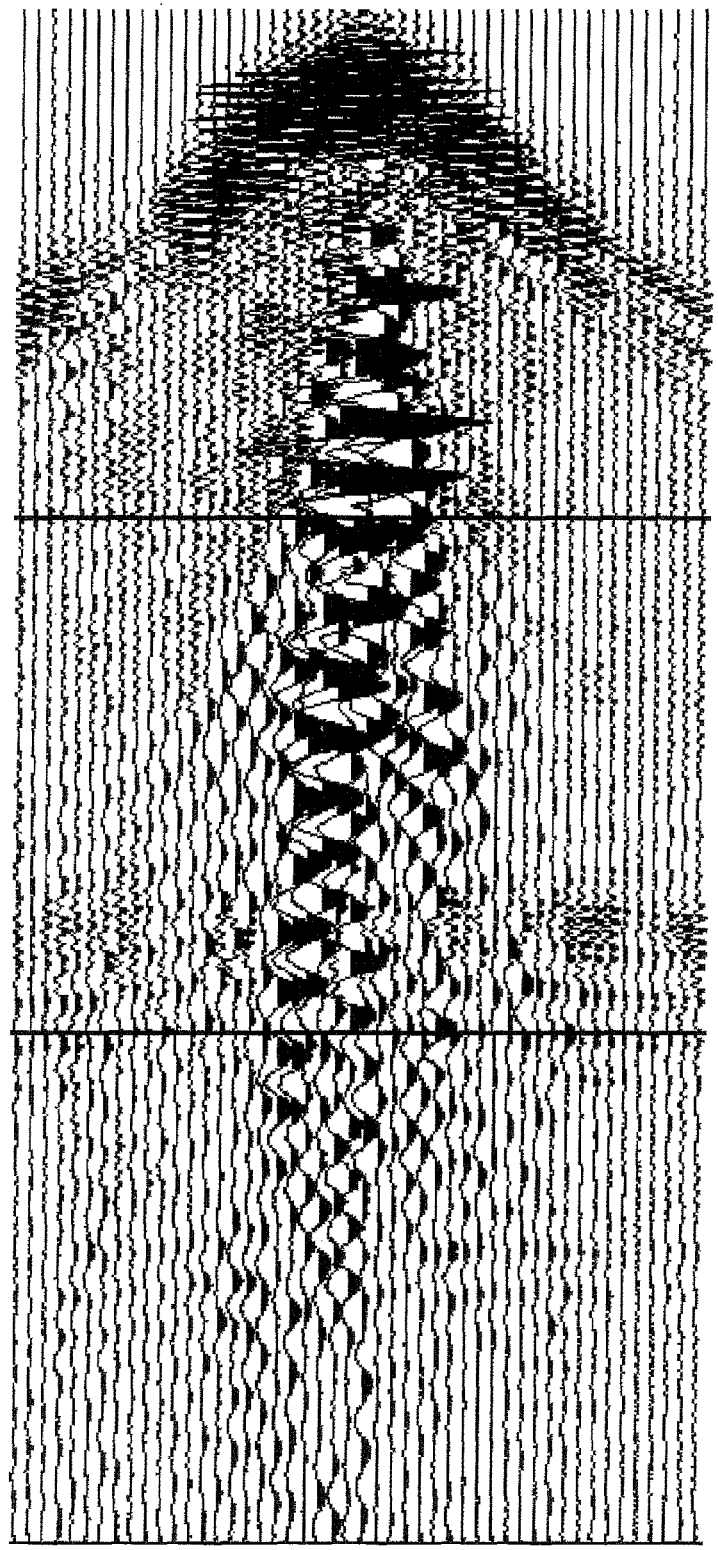
FIG. 23 is a shot gather illustrating the difference between the shot gather of FIG. 22 and the shot gather of FIG. 18.

To illustrate the improved results attainable by the methods presented herein, FIG. 22 is provided. FIG. 22 shows the result of a conventional frequency filtering applied to the original seismic data traces (FIG. 18) with a band pass of 10, 15-35, 40 Hz. FIG. 22 reveals that noise is not as well removed as compared to FIG. 20. The difference between the result of conventional band pass filtering (FIG. 22) and the original seismic shot gather (FIG. 18) is illustrated by FIG. 23.

Windowed Spectrum Computation

In yet another further aspect, a spectrum of a segment of a decomposed seismic data trace may be computed by addition of the spectrums of the wavelets inside the segment of the seismic data trace. Given a segment or time window within the decomposed seismic data trace, wavelets within the time window can be found. Suppose there are P wavelets inside the segment or time window and their wavelet spectrums are $S_1(f), S_2(f) \ldots S_p(f)$. The spectrum of the segment or seismic signal within the time window $S(f)$ can be computed by $$S(f)=S_1(f)+S_2(f)+\ldots+S_p(f)$$

When the wavelet type of decomposing wavelets has an analytical expression for spectrum, such as Ricker wavelet, the spectrum of a given segment or seismic signal within a time window of the seismic data trace can be computed without using the conventional Fast Fourier Transform method.

Figure 29A:
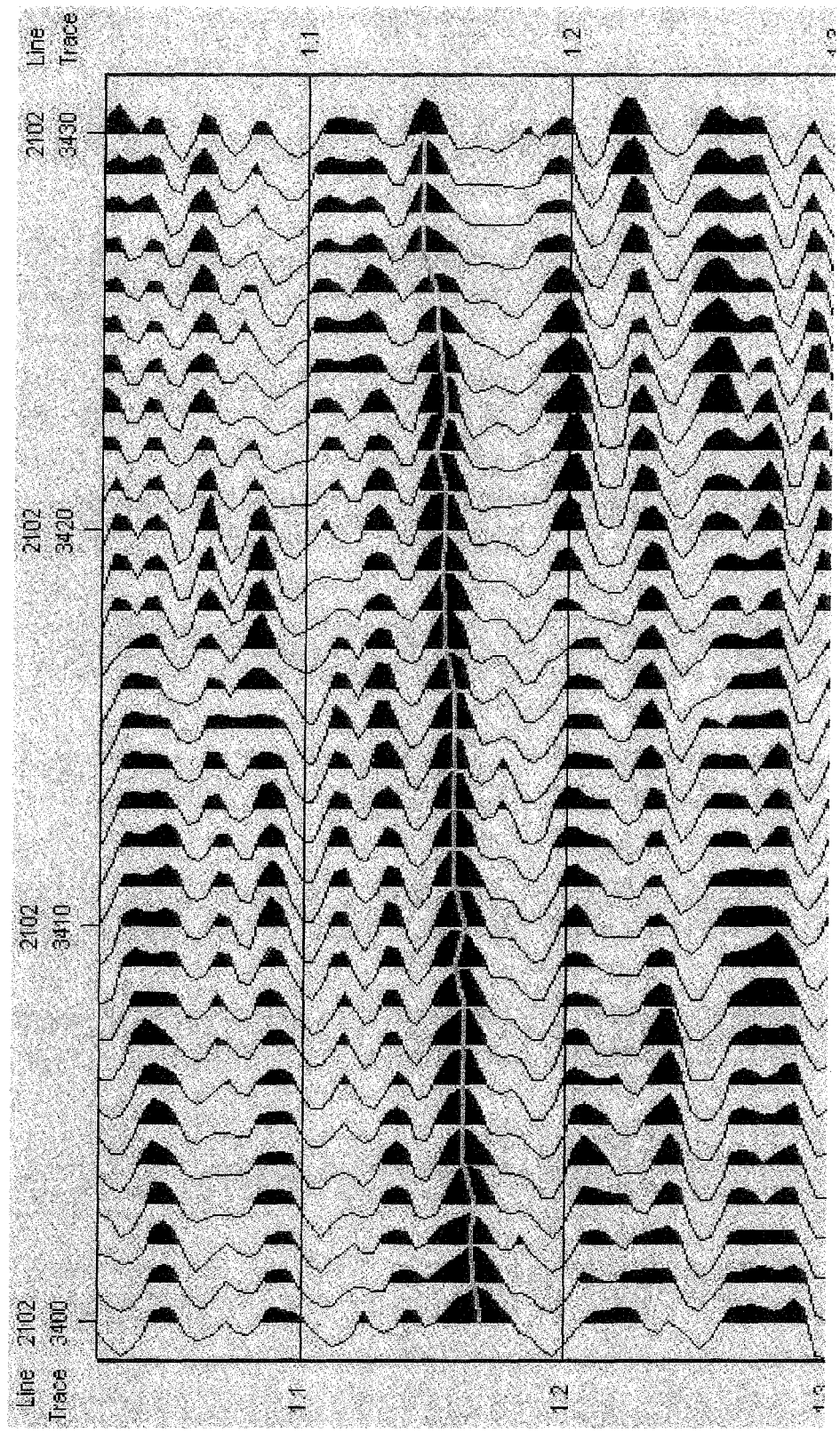
FIG. 29A is an illustration of a reconstructed seismic section with a horizon between 1.1 and 1.2 second.
Figure 29B:
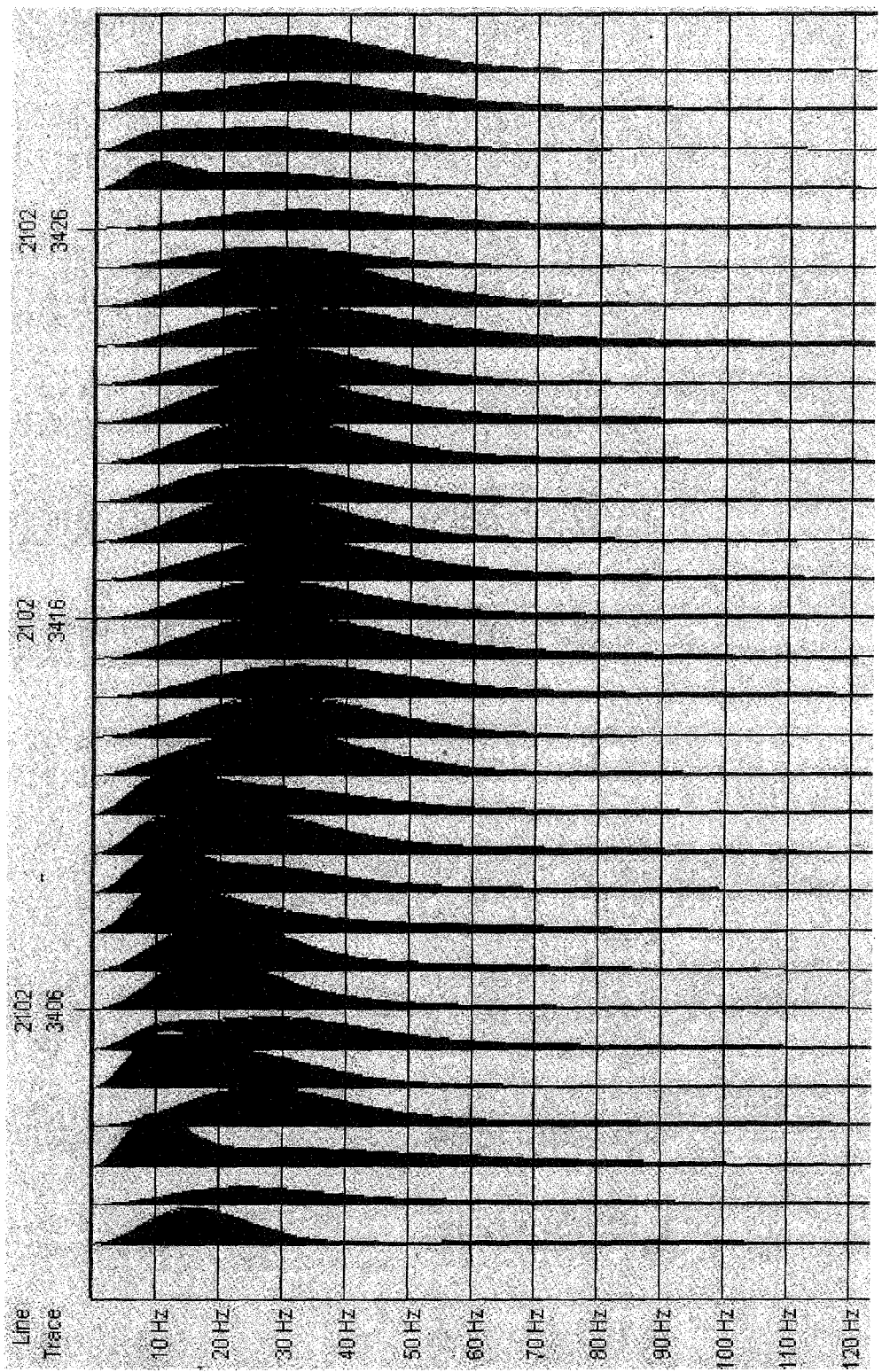
FIG. 29B is an illustration of power spectrums computed from seismic segments in a time window of size of 20 milliseconds starting from 5 milliseconds above the horizon.

FIG. 29A shows a seismic section that is reconstructed with all wavelets and FIG. 29B shows the spectrum computed from a time window of size of 20 milliseconds starting from 5 milliseconds above the horizon.

Exemplary Processing Wavelet-Based Gain Control

The amplitudes of a seismic data trace decay rapidly with depth or time of recording due to such factors as geometric spreading and/or changes in the frequency content in a time variant manner. Geometric spreading occurs where the energy density decays proportionately to $1/r^2$, where r is the distance of the wavefront to its seismic source. The amplitude of the wavelets is proportional to the square root of energy density; it decays as $1/r$. The second effect on a propagating wavefield arises from the change that the frequency content of the initial source signal undergoes as it propagates. The frequency content changes in a time-variant manner. The high frequencies are absorbed more rapidly than lower frequencies because of the intrinsic attenuation in rocks.

Gain refers to a time-variant scaling technique in which the scaling function is based on a desired criterion. This concept and technique are generally known in the art. A gain function is normally applied to the seismic data traces to compensate for geometric spreading early. This is normally done in processing. An exponential gain may also be applied to compensate for attenuation losses. In displaying a seismic data trace, the size of amplitude decay is far beyond the range of visibly displaying it on a computer screen or plotting it on a hard copy such as paper. An automatic gain control (AGC) is usually applied before display.

Trace balancing refers to time-invariant scaling of amplitude samples. Although a gain function is different from time-variant scaling, trace balancing also involves multiplication of amplitude samples of the seismic data trace by a gain function. The Gain function is formulated as:

$$G(T_0)^*A_{T_0};$$

where $G(T_0)$ is the gain value at time $T_0$; * means multiplication by and $A_{T_0}$ is the amplitude of the said wavelet at time $T_0$. Preferably, this formula is applied to the wavelets computed during the decomposition of the seismic data trace into a set of time dependent wavelets.

The conventional application of a gain function to a seismic data trace is to multiply amplitudes of the seismic trace samples by the gain function at the same time position, which in the present description is referred to as sample-based gain application. This approach has an intrinsic defect. Because the gain values are not constant but become larger with time, the shape of the embedded wavelets becomes distorted and changes that are contained in the seismic data traces. The simple drawings, from FIG. 24A to FIG. 24D, show how the wavelet shape is distorted.

Figure 24A:
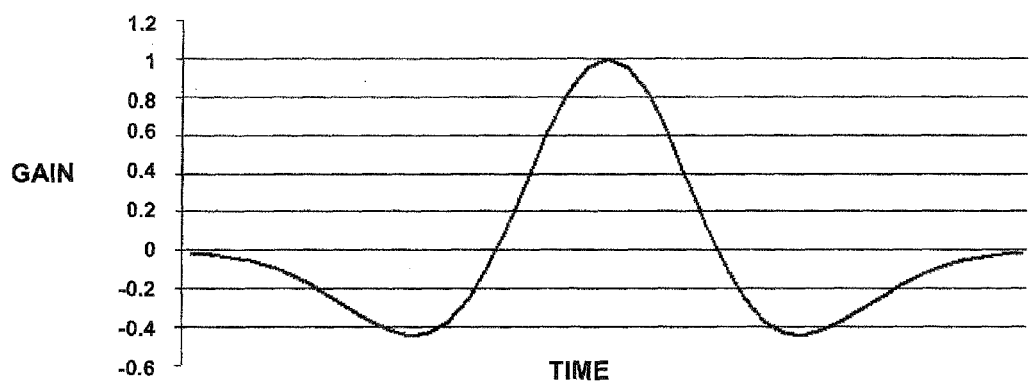
FIG. 24A illustrates an original Ricker wavelet.
Figure 24B:
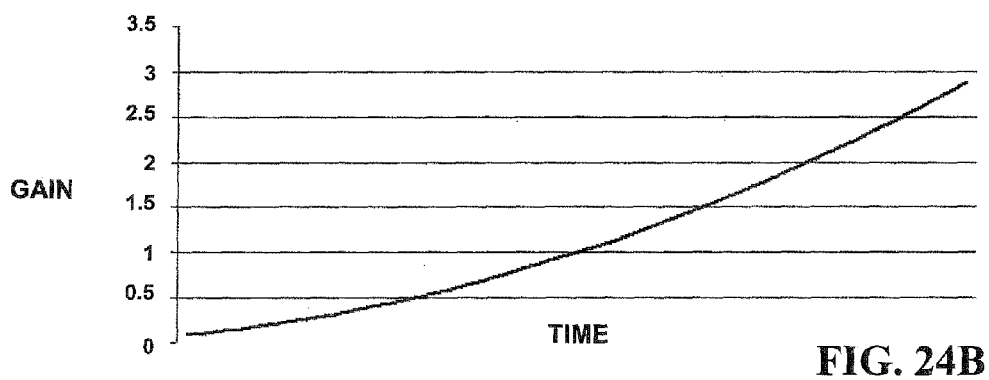
FIG. 24B illustrates a gain function.
Figure 24C:
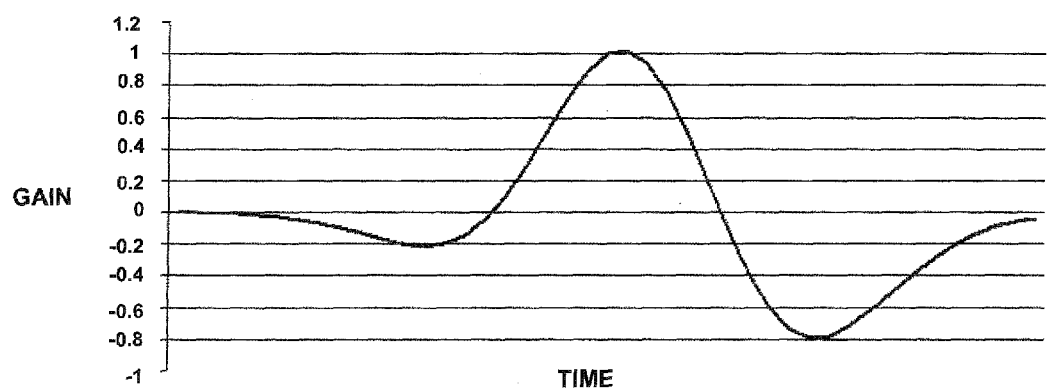
FIG. 24C illustrates a result after the gain is applied to the original Ricker wave.
Figure 24D:
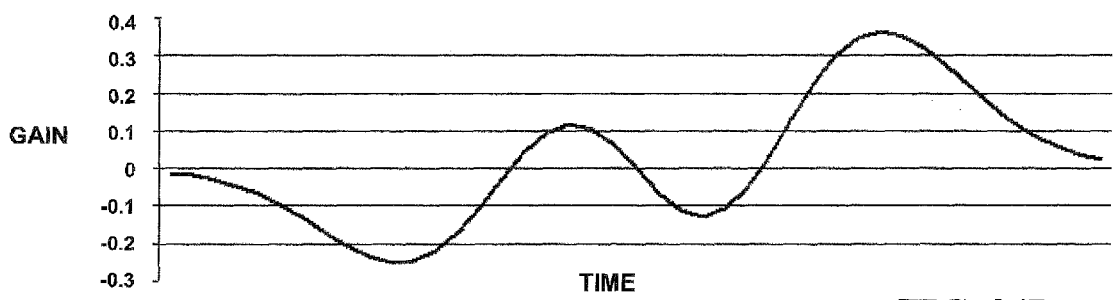
FIG. 24D illustrates the difference of the original Ricker wavelet from the wavelet after gain application.

FIG. 24A illustrates an original Ricker wavelet. FIG. 24B illustrates the gain function in which the gain value is 1.0 at the center of the wavelet and increases with time. FIG. 24C illustrates the result after the gain is applied to the wavelet. It can be seen that the shape of the wavelet is distorted. FIG. 24D illustrates the difference of the original wavelet from the wavelet after gain application.

In one aspect, a method is provided for applying the gain function to the amplitudes of the wavelets that are embedded inside seismic data traces to avoid distortion to the wavelets.

The instant method may involve three steps to apply the gain function to a seismic data trace. However, it should be appreciated that other steps may be added or deleted and should not be viewed as a limitation herein. First, the seismic data trace is decomposed into a set wavelets of different shapes or dominant frequencies, as discussed previously. Next, the gain function is applied to the amplitudes of the decomposed wavelets to form a new set of time dependent wavelets. Then, a new seismic data trace is reconstructed using the new set of wavelets. This new seismic data trace is the output trace with wavelet-based gain application.

Figure 25:
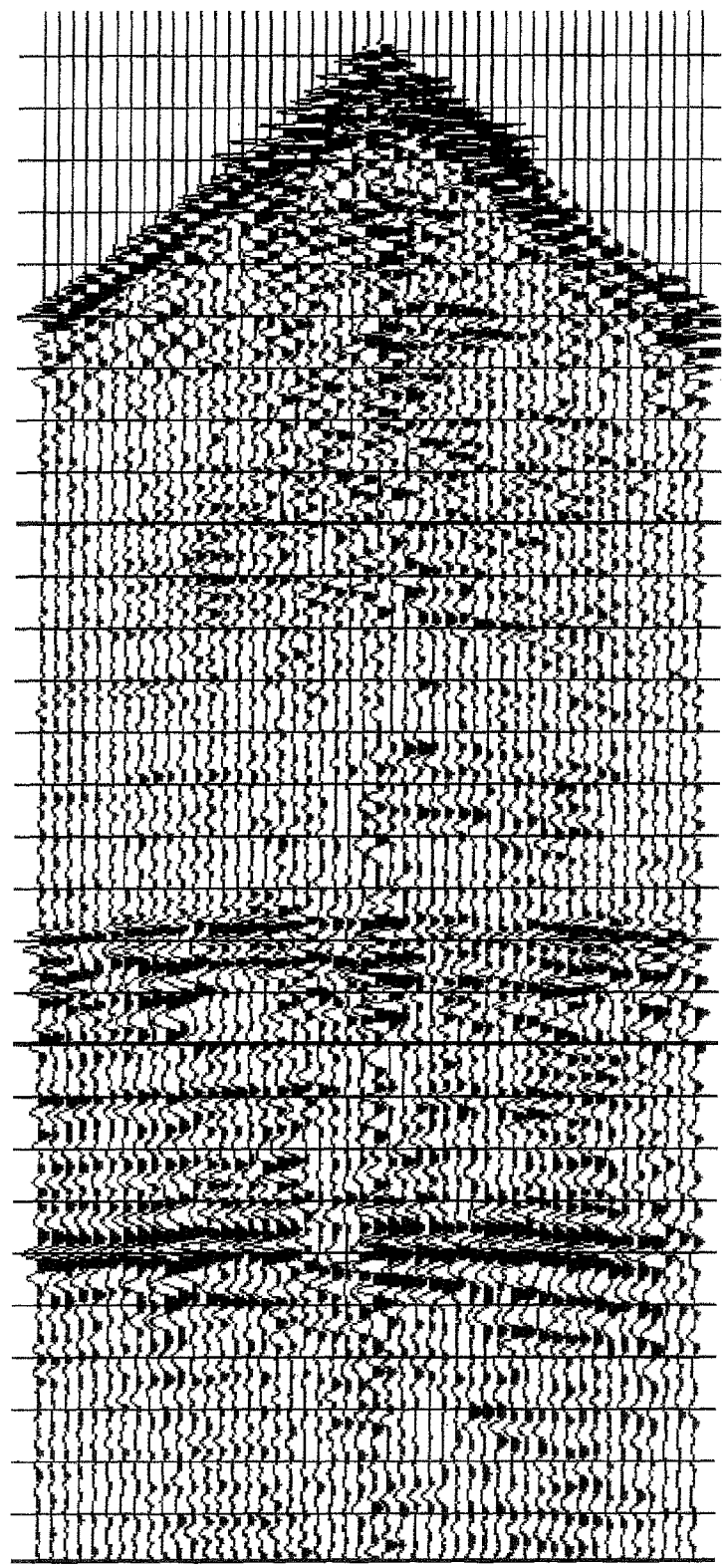
FIG. 25 is a shot gather with normal sample-based gain control.
Figure 26:
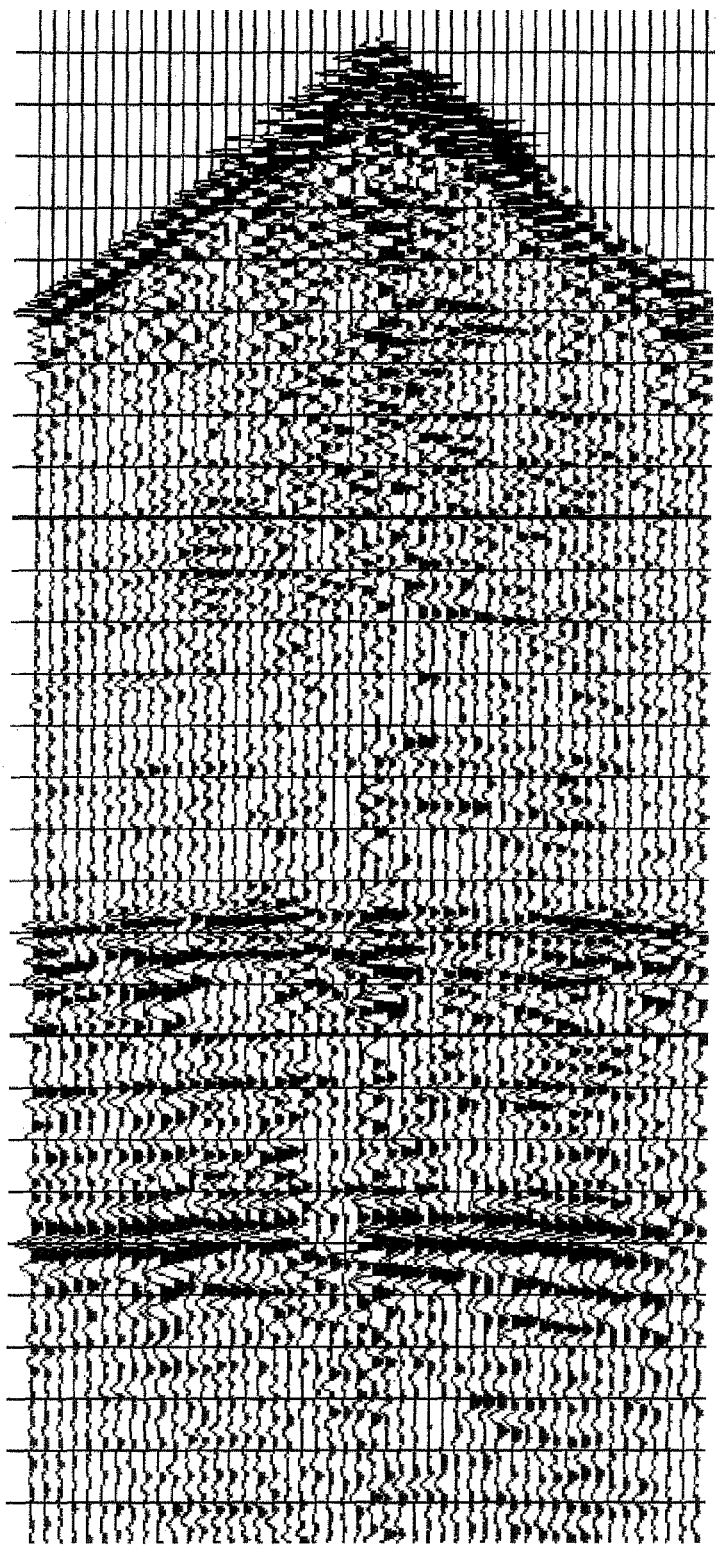
FIG. 26 is a shot gather with wavelet-based gain control.

FIG. 25 illustrates a shot gather with normal sample-based gain application. FIG. 26 illustrates the same shot gather with wavelet-based gain application, according to an embodiment of the present invention. The gain function is the same for both sample-based gain application and wavelet-based gain application. The sample-based gain application multiplies the amplitude samples of the seismic traces by the gain function, while wavelet-based gain application multiplies the amplitudes of the wavelets inside the seismic trace by the gain function.

Figure 27:
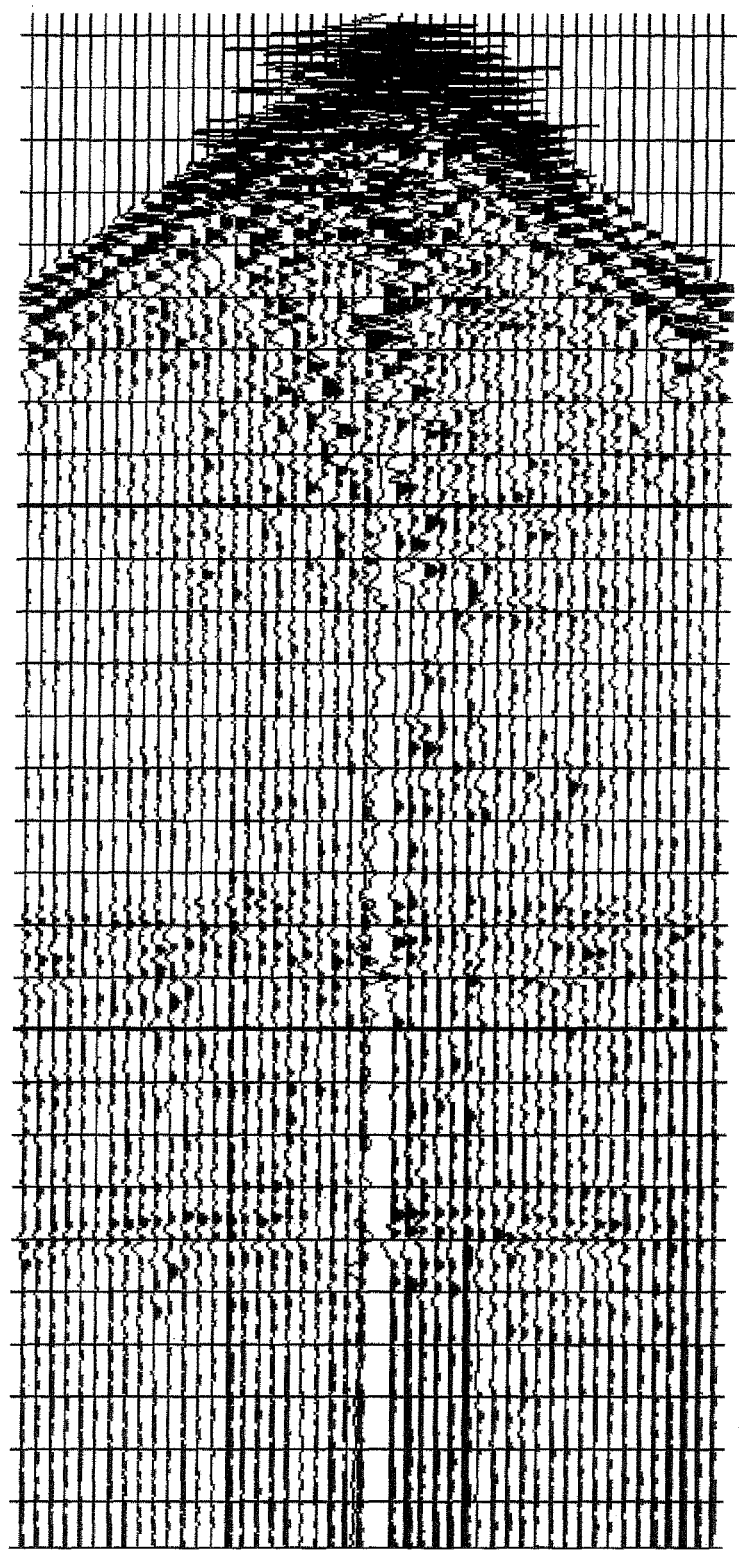
FIG. 27 is a shot gather illustrating the difference between a shot gather with normal gain control (FIG. 25) and a shot gather with wavelet-based gain control (FIG. 26)
Figure 28A:
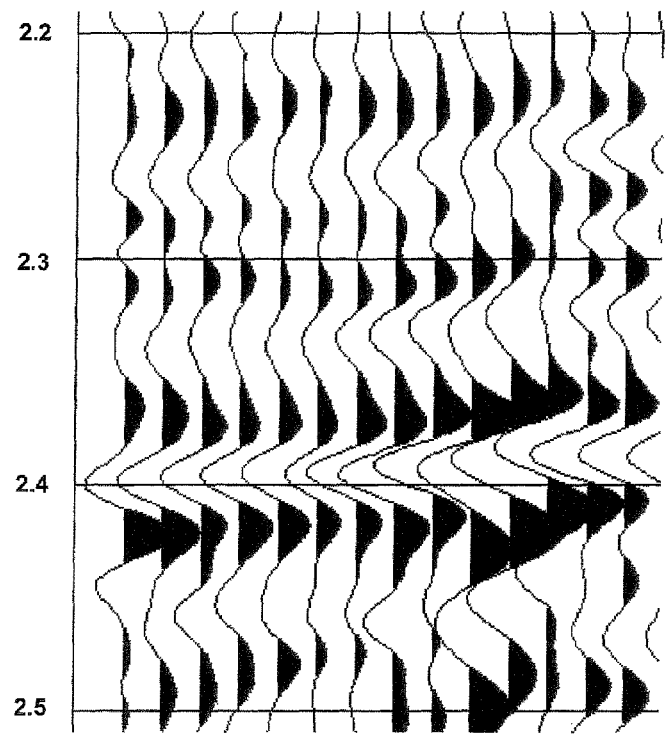
FIG. 28A is an illustration of an enlarged part of a shot gather with wavelet-based gain control.
Figure 28B:
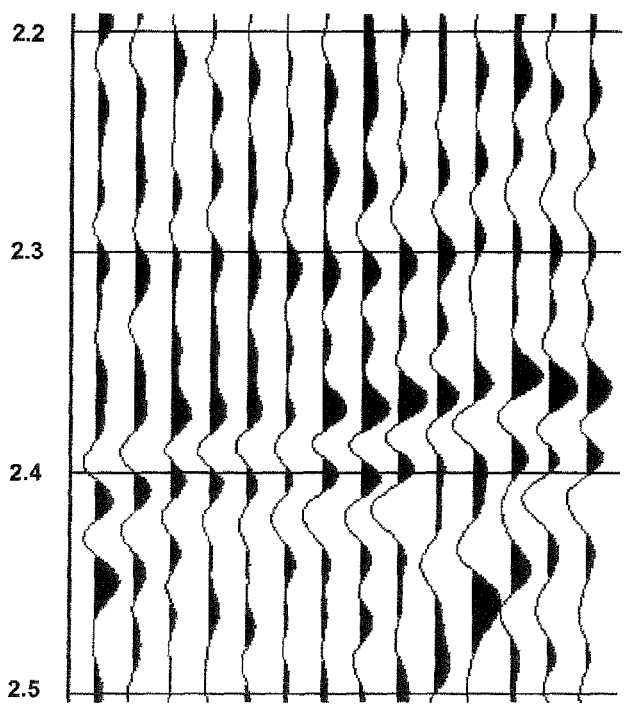
FIG. 28B is an illustration of an enlarged part of the difference between shot gather with normal gain control and wavelet-based gain control.

FIG. 27 illustrates the difference between the wavelet-based gain application and sample-based gain application. FIG. 28A illustrates an enlarged part of the wavelet-based gain application and FIG. 28B illustrates the same enlarged part of the difference of the wavelet-based gain application and sample-based gain application. The difference shows the amount of distortion or shape change of the conventional sample-based gain application.

The foregoing description of the present invention has been presented for purposes of illustration and description. It is to be noted that the description is not intended to limit invention to the apparatus, and method disclosed herein. Various aspects of the invention as described above may be applicable to other types of engines and mechanical work devices and methods for harnessing radiation pressure to generate mechanical work. It is to be noted also that the invention is embodied in the method described, the apparatus utilized in the methods, and in the related components and subsystems. These variations of the invention will become apparent to one skilled in the optics, engine art, or other relevant art, provided with the present disclosure. Consequently, variations and modifications commensurate with the above teachings and the skill and knowledge of the relevant art are within the scope of the present invention. The embodiments described and illustrated herein are further intended to explain the best modes for practicing the invention, and to enable others skilled in the art to utilize the invention and other embodiments and with various modifications required by the particular applications or uses of the present invention.

The Invention claimed is:

1. A method of processing seismic data for interpretation, said method comprising the steps of:
    recording an original seismic data trace;
    decomposing the original seismic data trace into a set of seismic wavelets of different shapes, wherein each of the seismic wavelets is a time domain reflection shape from a single positive reflector at normal incidence; and
    reconstructing a seismic data trace from, at least a subset of, the set of wavelets; and
        wherein said decomposing step includes:
            establishing a wavelet base;
            establishing a linear program based on the wavelet base and the original seismic data trace; and solving the linear program to obtain the set of seismic wavelets of different shapes; and wherein the original seismic data trace has Ns amplitude data samples; and wherein establishing a wavelet base includes selecting M wavelets;

wherein establishing matrix A includes establishing matrix A of Ns rows and N columns:

$A=\{A_1, A_2, \ldots, A_1 \ldots A_N\}$ where $A_i$ is defined by, for each selected wavelet, positioning the selected wavelet at each amplitude data sample, thereby creating a first set of M*Ns columns, creating a second set of columns by recreating M*Ns columns and then multiplying by −1, adding the first and second set of columns such that the total number of columns in matrix A equals to 2*M*Ns, computing the analytical positions of maximums and minimums of each of the Ns amplitude data samples, wherein Nmax and Nmin are the number of maximum and minimum positions, respectively, and adding M positive wavelet columns at each maximum and M negative wavelet columns at each minimum such that the total number of columns, N, in matrix A equals to (2*M*Ns) +(M*Nmax)+(M*Nmin); and wherein establishing a linear program further includes assigning all elements in C to 1.0 and the seismic values to B, such that the solving step includes solving the linear program:

Minimize: CX

Subject to: AX=B

X≥0, whereby columns corresponding to non-zero elements X is the set of wavelets of different shapes, and wherein vector C is composed of weight of corresponding columns of the wavelet vectors.

2. The method of claim 1, wherein said decomposing step includes decomposing the original seismic data trace into a set of wavelets of a plurality of types.

3. The method of claim 1, wherein the decomposing step includes:

establishing a wavelet base of different wavelet types; and generating a series of wavelets of different shapes for each wavelet type.

4. The method of claim 1, wherein the reconstructing step includes reconstructing a new seismic data trace from a subset of the set of wavelets.

5. The method of claim 1, wherein the wavelet base includes wavelets of different extracted and synthetic wavelet types, said decomposing step further including selecting one or more wavelet types for decomposing the seismic data traces.

6. The method of claim 5, further comprising selecting wavelets over a range of dominant frequencies, the selected wavelets having a dominant frequency spaced at an interval over a range of dominant frequencies.

7. The method of claim 6, further comprising changing the interval of the dominant frequencies of the selected wavelets from a first interval value to a second interval value to change the accuracy of the decomposition and reconstruction steps.

8. The method of claim 7, further comprising accelerating a decomposition computation by increasing the interval.

9. The method of claim 1, wherein the wavelet base includes a plurality of wavelets of each wavelet type, each of the plurality of wavelets of each wavelet type having a dominant frequency.

10. The method of claim 1, wherein said step of establishing a linear program includes establishing a matrix A composed of columns of wavelet vectors and a vector B of the original seismic data trace, defining a vector C, and deriving the linear program as:

minimize: CX subject to AX=B and X≥0 where X is the vector of variables to be solved for, CX is the objective function.

11. The method of claim 10, wherein establishing a matrix A is carried out in dependence upon positions of analytical minimums of the original seismic data trace.

12. The method of claim 10, wherein establishing a matrix A is carried out in dependence upon positions of analytical maximums of the original seismic data trace.

13. The method of claim 1, further comprising:

removing noise wavelets from the set of wavelets, thereby forming a new set of wavelets, said reconstructing step including, reconstructing a new seismic data trace from said new set of wavelets.

14. The method of claim 13, wherein the removing step includes excluding wavelets of noise based on wavelet dominant frequencies.

15. The method of claim 14, wherein said removing step includes employing a polygonal wavelet pass in dominant or characteristic frequency and time coordinate plane to select a subset of wavelets.

16. The method of claim 1, wherein the decomposing step includes applying a gain function to amplitudes of the wavelets to form a new set of wavelets, whereby the reconstructing step is performed using the new set of wavelets, and wherein the gain function is formulated as $G(T_0)*A_{T_o}$, where $G(T_0)$ is the gain value at time $T_0$;

* means multiplication by; and $A_{T_o}$ is the amplitude of the wavelet at time $T_0$.

17. The method of claim 1, wherein each of the seismic wavelets has a wavelet position determined by subsurface rock boundaries, wherein the decomposition step fixes the wavelet positions.

18. The method of claim 1, wherein the decomposing step further includes recording vector X, including recording, for each wavelet, amplitude, time position corresponding to the original seismic data trace, and wavelet type and frequency.

19. The method of claim 1, wherein each of the seismic wavelets is a seismic pulse.

20. A method of processing seismic data for interpretation, said method comprising the steps of:

recording an original seismic data trace;

decomposing the original seismic data trace into a set of predefined seismic wavelets of different shapes, wherein the seismic wavelet is a time domain reflection shape from a single positive reflector at normal incidence;

identifying embedded seismic wavelets within a segment of the original seismic data trace;

computing the spectrums for the wavelets; and computing a summation of the spectrums of the wavelets; and wherein said decomposing step includes:

establishing a wavelet base;

establishing a linear program based on the wavelet base and the original seismic data trace; and solving the linear program to obtain the set of seismic wavelets of different shapes; and wherein the original seismic data trace has Ns amplitude data samples; and wherein establishing a wavelet base includes selecting M wavelets;

wherein establishing matrix A includes establishing matrix A of Ns rows and N columns:

$A = \{A_1, A_2, \ldots, A_i \ldots A_N\}$ where $A_i$ is defined by, for each selected wavelet, positioning the selected wavelet at each amplitude data sample, thereby creating a first set of M*Ns columns, creating a second set of columns by recreating M*Ns columns and then multiplying by −1, adding the first and second set of columns such that the total number of columns in matrix A equals to 2*M*Ns, computing the analytical positions of maximums and minimums of each of the Ns amplitude data samples, wherein Nmax and Nmin are the number of maximum and minimum positions, respectively, and adding M positive wavelet columns at each maximum and M negative wavelet columns at each minimum such that the total number of columns, N, in matrix A equals to (2*M*Ns)+(M*Nmax)+(M*Nmin); and wherein establishing a linear program further includes assigning all elements in C to 1.0 and the seismic values to B, such that the solving step includes solving the linear program:

Minimize: CX

Subject to: AX=B $X \geq 0$, whereby columns corresponding to non-zero elements X is the set of wavelets of different shapes, and wherein vector C is composed of weight of corresponding columns of the wavelet vectors.

* * * * *

UNITED STATES PATENT AND TRADEMARK OFFICE
CERTIFICATE OF CORRECTION

| | | |
|---|---|---|
| PATENT NO. | : 8,976,624 B2 | Page 1 of 1 |
| APPLICATION NO. | : 12/154276 | |
| DATED | : March 10, 2015 | |
| INVENTOR(S) | : Ping An | |

It is certified that error appears in the above-identified patent and that said Letters Patent is hereby corrected as shown below:

In the Claims:

Claim 20, Column 17, line 3, delete "$A7_2$," and insert -- $A_2$, --.

Signed and Sealed this
Twenty-third Day of June, 2015

Michelle K. Lee
*Director of the United States Patent and Trademark Office*